(12) United States Patent
Bienkowski

(10) Patent No.: US 9,361,096 B1
(45) Date of Patent: Jun. 7, 2016

(54) LINKING CODE AND NON-CODE IN A PROGRAMMING ENVIRONMENT

(71) Applicant: The MathWorks, Inc., Natick, MA (US)

(72) Inventor: Joseph R. Bienkowski, Ashland, MA (US)

(73) Assignee: The MathWorks, Inc., Natick, MA (US)

( * ) Notice: Subject to any disclaimer, the term of this patent is extended or adjusted under 35 U.S.C. 154(b) by 17 days.

(21) Appl. No.: 14/190,744

(22) Filed: Feb. 26, 2014

(51) Int. Cl.
*G06F 9/44* (2006.01)

(52) U.S. Cl.
CPC .......................................... *G06F 8/73* (2013.01)

(58) Field of Classification Search
CPC ................ G06F 8/71; G06F 8/73; G06F 8/75
USPC ......................................................... 717/123
See application file for complete search history.

(56) References Cited

U.S. PATENT DOCUMENTS

| | | | | |
|---|---|---|---|---|
| 5,862,379 | A * | 1/1999 | Rubin et al. | 717/109 |
| 7,346,849 | B1 * | 3/2008 | Mulligan et al. | 715/763 |
| 2008/0250394 | A1 * | 10/2008 | Jones et al. | 717/123 |
| 2008/0263518 | A1 * | 10/2008 | Bank et al. | 717/120 |
| 2013/0185700 | A1 * | 7/2013 | Avrahami et al. | 717/120 |

OTHER PUBLICATIONS

Nagano et al., Recovering Traceability Links between Code and Documentation for Enterprise Project Artificats, IEEE 2012, 11-18.*

* cited by examiner

*Primary Examiner* — Anna Deng
(74) *Attorney, Agent, or Firm* — Harrity & Harrity, LLP

(57) ABSTRACT

A device may receive information that identifies code included in a document provided via a programming environment. The code may include executable program code capable of being executed via the programming environment. The device may receive information that identifies non-code included in the document. The non-code may include information other than executable program code. The device may receive an indication to link a code portion, included in the code, and a non-code portion, included in the non-code, and may create a link between the code portion and the non-code portion based on receiving the indication. The device may provide, via a user interface, content included in the document. The content may include the code portion, the non-code portion, and other information included in the document. The device may provide, via the user interface, a link indicator that identifies the link between the code portion and the non-code portion.

20 Claims, 29 Drawing Sheets

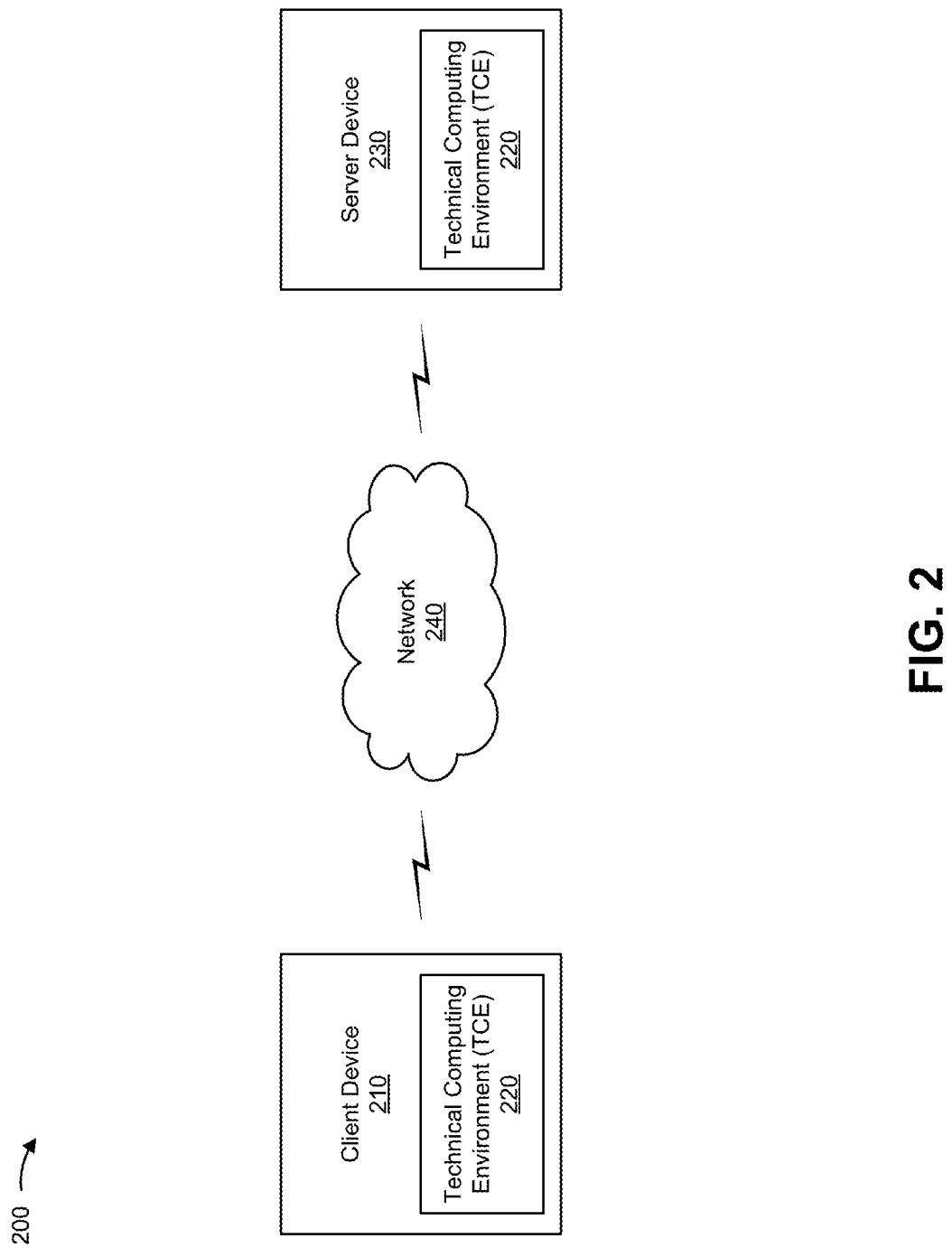

TECHNICAL COMPUTING ENVIRONMENT (TCE)

File  Edit  Tools  View  Execute

Viewing a Penny

This example shows four techniques to visualize the surface data of a penny. The file PENNY.MAT contains measurements made at the National Institute of Standards and Technology of the depth of the mold used to mint a U.S. penny, sampled on a 128-by-128 grid.

Drawing a Contour Plot

Draw a contour plot with 15 copper colored contour lines.

```
load penny.mat
contour (P,15)
colormap (copper)
axis ij square
```

510

515

| Create Link |
|---|
| Remove Link |
| Edit Link |

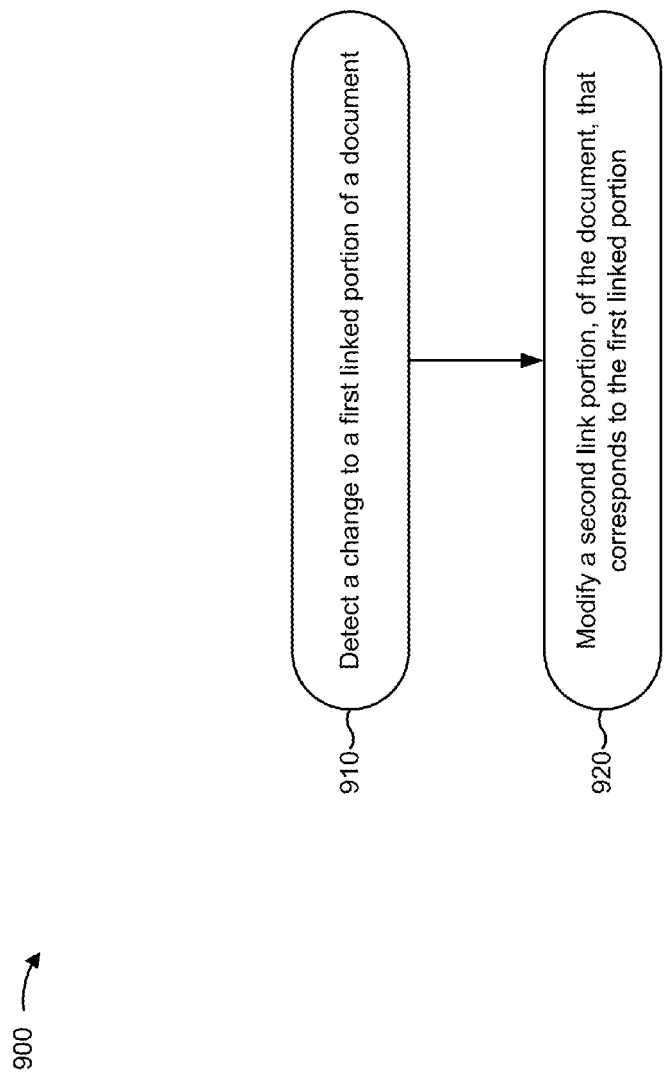

Viewing a Penny

This example shows four techniques to visualize the surface data of a penny.

This image of a penny [penny.png] includes contour data that can be used in a contour plot. 1035

Drawing a Contour Plot

Draw a contour plot with 40 copper colored contour lines.

```
load penny.png      1040
contour (P,40)
colormap (copper)
axis ij square
```

FIG. 10F

TECHNICAL COMPUTING ENVIRONMENT (TCE)  
File  Edit  Tools  View  Execute

The DoMath Function

The DoMath function adds two values, and multiplies the result by a third value.

Example

```
//The following function calculates x plus y, and multiplies the
result by z domath(x, y, z)
    output = (x + y) × z
    return output
```

Conditional Statements

The DoMath function can be used with conditional statements, such as an "if" statement.

```
//The following code executes the domath function if j is greater than k if j > k
    domath(x, y, z)
endif
```

Link Indicator Options

Manual link determination

Automatic link determination

TECHNICAL COMPUTING ENVIRONMENT (TCE)  [_][□][X]
File  Edit  Tools  View  Execute

The DoMath Function

The DoMath function adds two values, and multiplies the result by a third value.

Example
1120

```
//The following function calculates x plus y, and multiplies the
result by z
domath(x, y, z)
    output = (x + y) × z
return output
```

Conditional Statements

The DoMath function can be used with conditional statements, such as an "if" statement.
The following code executes the domath function if j is greater than k.
1125

```
//The following code executes the domath function if j is greater than k
if j > k
    domath(x, y, z)
endif
```

FIG. 11C

The DoMath Function

The DoMath function adds two values, and divides the result by a third value.

Example

```
//The following function calculates x plus y, and multiplies the
result by z domath(x, y, z)
    output = (x = y) x z
    return output
```

1150

Conditional Statements

The DoMath function can be used with conditional statements, such as an "if" statement. The following code executes the domath function if j is less than k.

```
//The following code executes the domath function if j is less than k if j > k
    domath(x, y, z)
endif
```

FIG. 11E

The DoMath Function

The DoMath function subtracts two values, and divides the result

Example

```
//The following function calculates x minus y, and
domath(x, y, z)
    output = (x - y) / z
return output
```

1175

Conditional Statements

The DoMath function can be used with conditional statements, su 1180

```
//The following code executes the domath function
if j < k
    domath(x, y, z)
endif
```

| List of Links | | |
|---|---|---|
| Code | | Non-Code |
| domath(1) | | domath (1 link) |
| domath(2) | | domath (2 links) |
| - | | subtract, minus |
| / | | divides |
| x | | x |
| y | | y |
| z | | z |
| j | | j |
| k | | k |
| < | | less than |
| ... | | |
| = | greater than | |
|  | *MISMATCH* | |

FIG. 11G

LINKING CODE AND NON-CODE IN A PROGRAMMING ENVIRONMENT

BRIEF DESCRIPTION OF THE DRAWINGS

FIG. 2 is a diagram of an example environment in which system and/or methods described herein may be implemented;

FIGS. 5A-5C are diagrams of an example implementation relating to the example process shown in FIG. 4;

FIG. 9 is a flow chart of an example process for modifying linked code based on a change to corresponding non-code, or modifying linked non-code based on a change to corresponding code;

FIGS. 10A-10F are diagrams of an example implementation relating to the example process shown in FIG. 9; and FIGS. 11A-11G are diagrams of an example implementation relating to the example processes shown in FIG. 4 and FIG. 9.

DETAILED DESCRIPTION

The following detailed description of example implementations refers to the accompanying drawings. The same reference numbers in different drawings may identify the same or similar elements.

A user, such as a computer programmer, may create a document that includes program code (sometimes referred to herein as code). The document may also include non-code, such as a comment related to the code, a textual description of the code, or the like. The user may make a change to the code and forget to make a corresponding change to the non-code, or may make a change to the non-code and forget to make a corresponding change to the code. When the document is viewed at a later time, a viewer may have difficulty understanding the code if the non-code, associated with the code, describes the code incorrectly. Implementations described herein may overcome such difficulty by permitting a user to link code and non-code, and automatically updating one when the other is modified. For example, implementations described herein may update code to match an edit made to non-code, or may update non-code to match an edit made to code.

Figure 1A:
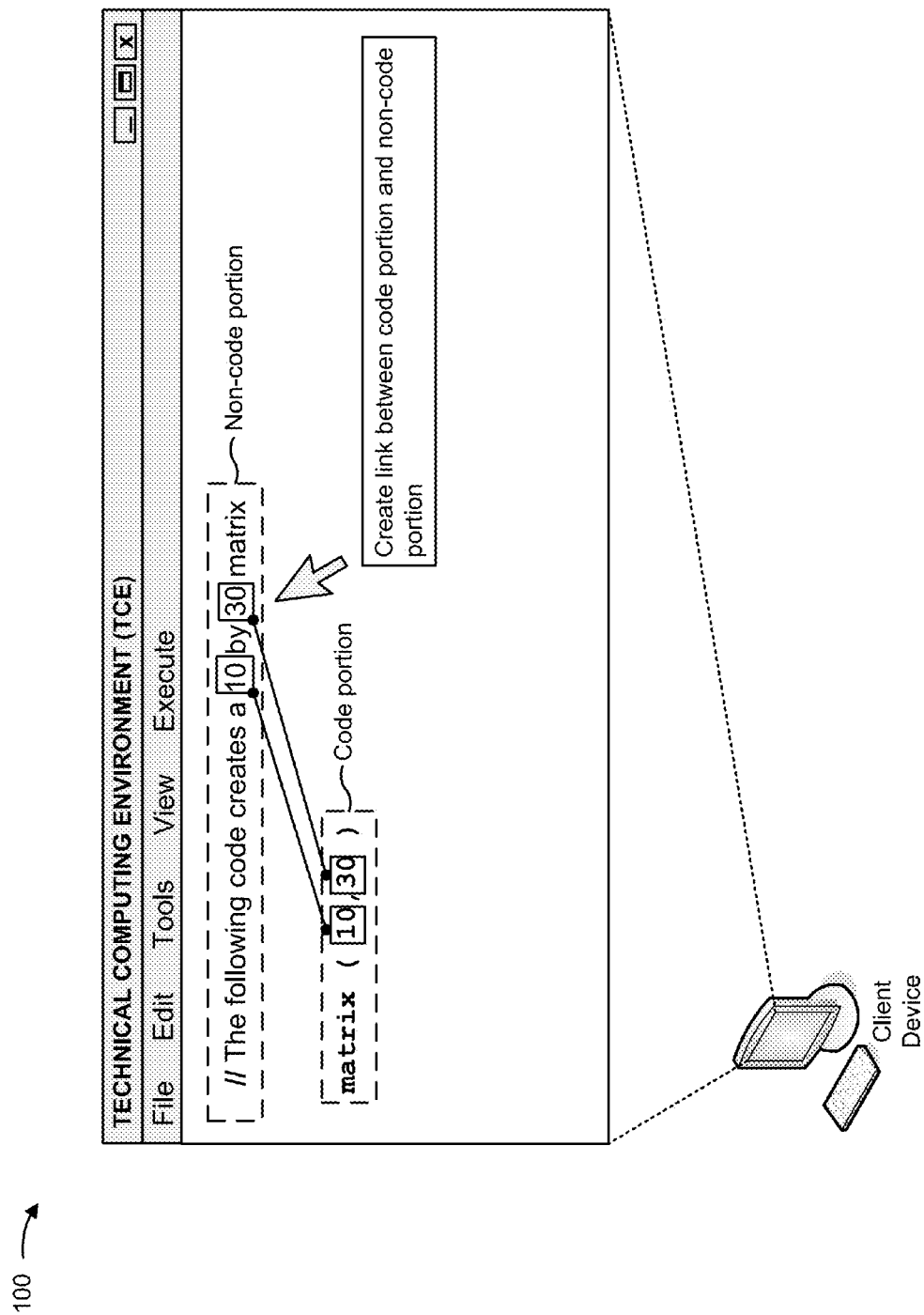
FIGS. 1A and 1B are diagrams of an overview of an example implementation described herein.
Figure 1B:
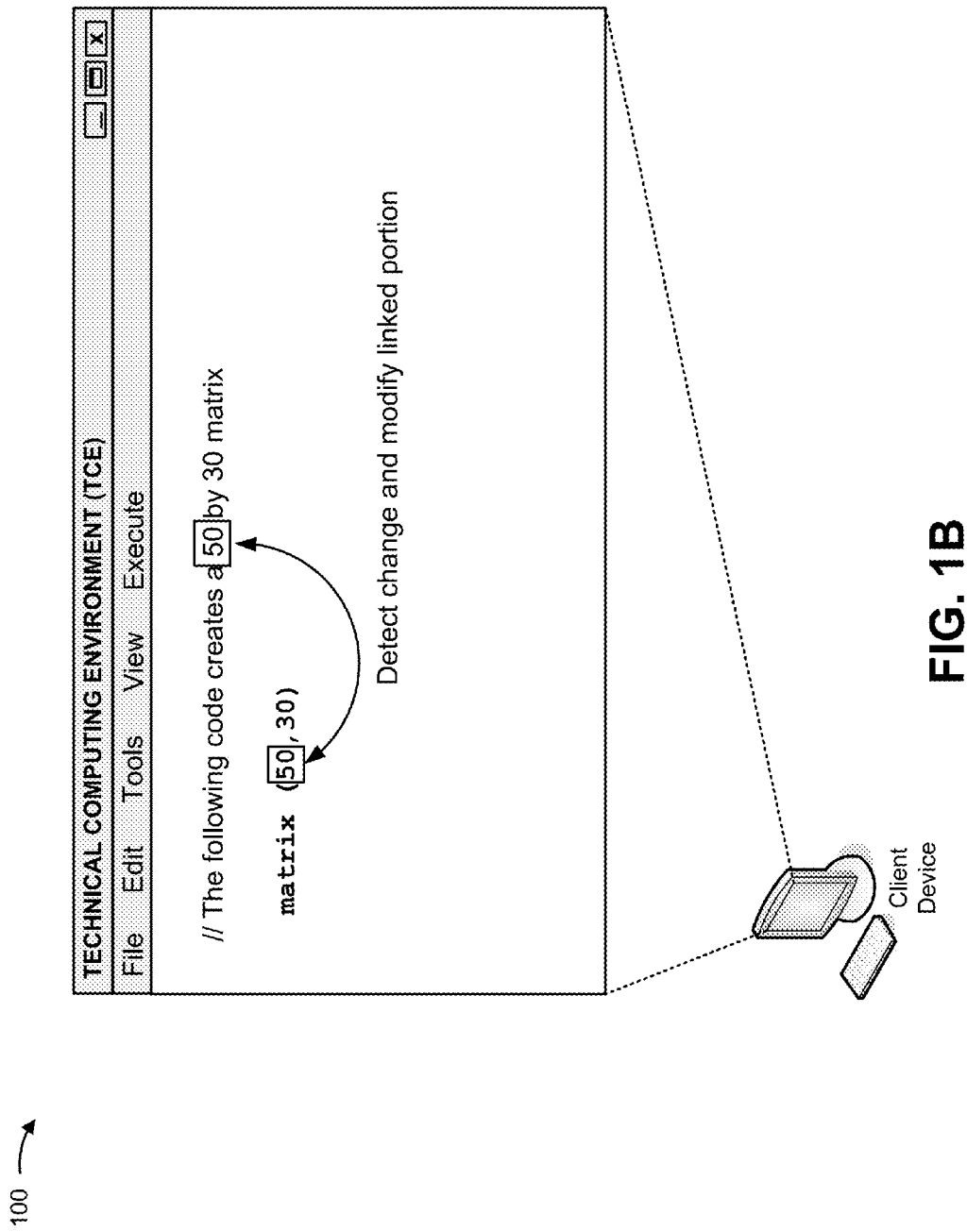

FIGS. 1A and 1B are diagrams of an overview of an example implementation 100 described herein. For the purpose of FIG. 1A, assume that a user is interacting with a technical computing environment (TCE) executing on a client device. For example, assume that the user inputs a comment into a programming environment, and the comment states that "The following code creates a 10 by 30 matrix" (e.g., where two forward slashes "//" indicate a comment). The comment is non-code because it is not executed when a program, in which the comment is included, is executed. Further, assume that the user inputs program code, shown as matrix(10,30). This program code executes when a program, in which the program code is included, is executed.

As further shown in FIG. 1A, the user may create one or more links between a code portion and a non-code portion. For example, assume that the user creates a first link between the number 10 in the comment and the number 10 in the program code. Further, assume that the user creates a second link between the number 30 in the comment and the number 30 in the program code. Such links may be input by the user, or may be automatically determined by the client device.

As shown in FIG. 1B, assume that the user changes the number 10 in the program code to the number 50, such that the code now states matrix(50,30). As further shown, the client device detects the change, and modifies the linked non-code portion based on the change. For example, the client device changes the number 10 in the comment to the number 50. As another example, assume that the user changes the number 10 in the non-code (e.g., the comment) to the number 50, such that the comment now states "The following code creates a 50 by 30 matrix." The client device may detect the change, and may modify the linked code portion based on the change (e.g., matrix(50,30)). In this way, code portions and non-code portions may be synchronized in a way to prevent confusion.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., non-code, a link between code and non-code, a document that includes code and non-code, etc.). For example, client device 210 may include a computing device, such as a desktop computer, a laptop computer, a tablet computer, a mobile phone (e.g., a smart phone, a radiotelephone, etc.), or a similar device. Client device 210 may compile and/or execute program code, and may ignore non-code portions when compiling and/or executing the program code. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. In some implementations, TCE 220 may include a programming environment capable of executing program code. For example, TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). TCE 220 may include a programming environment capable of executing the input program code. In some implementations, TCE 220 may permit the user to input non-code (e.g., a comment, plain text, rich text, an image, a video, a simulation, etc.) via the code editor. Additionally, or alternatively, TCE 220 may include a non-code editor portion that permits the user to input non-code.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
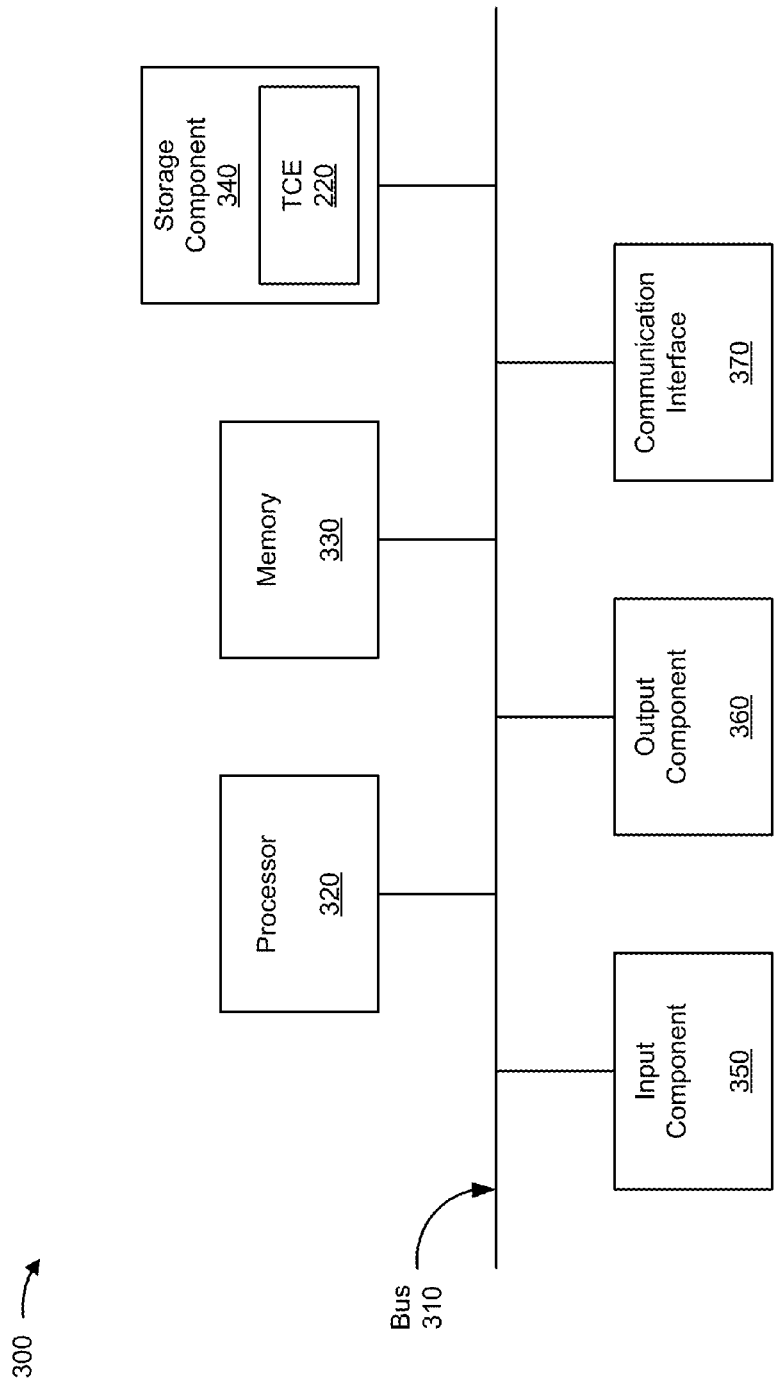
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
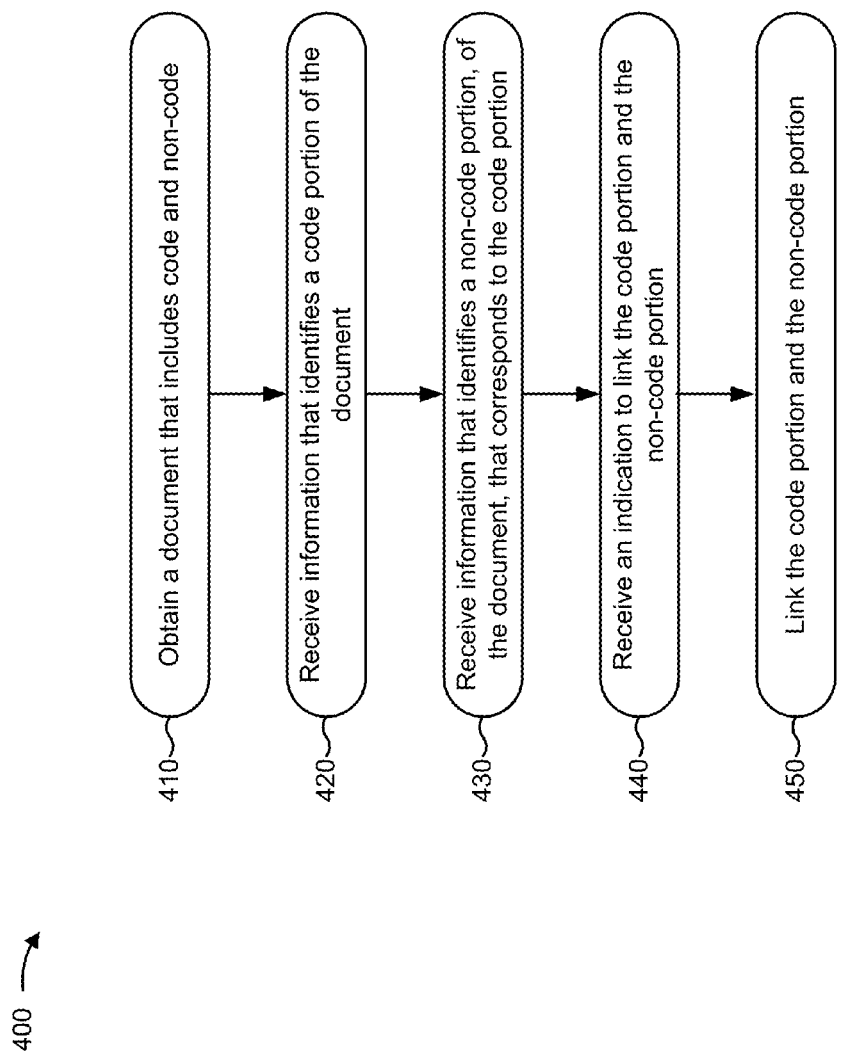
FIG. 4 is a flow chart of an example process for linking code and non-code in a programming environment.

FIG. 4 is a flow chart of an example process 400 for linking code and non-code in a programming environment. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include obtaining a document that includes code and non-code (block 410). For example, client device 210 may obtain a document that includes a program code (e.g., code) portion and a non-program code (e.g., non-code) portion. In some implementations, a user may input information identifying the document or a memory location at which the document is stored (e.g., local to and/or remote from client device 210). Based on the user input, client device 210 may retrieve the document. Additionally, or alternatively, client device 210 may provide a user interface (e.g., via TCE 220) via which a user may input information to a document, and client device 210 may obtain the code and/or the non-code based on the information input via the user interface.

The document may include program code and non-program code. Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Non-program code (sometimes referred to herein as non-code) may refer to text (e.g., plain text, rich text, a programming comment, etc.), an image, a video, an equation (e.g., generated via LaTeX markup language), text generated based on a markup language (e.g., HyperText Markup Language (HTML), Extensible Markup Language (XML), etc.), a result generated by executing code (e.g., an output), an object with a file name, etc. Non-code may include, for example, information that is not parsed by client device 210, that is not interpreted by client device 210, that is not compiled by client device 210, and/or that is not executed by client device 210 (e.g., when client device 210 parses, interprets, compiles, and/or executes program code). Non-code may be associated with code. For example, a non-code portion of the document may refer to a code portion of the document (e.g., a programming comment may refer to program code that follows the comment), a non-code portion may be generated by executing a code portion (e.g., an array generated by executing program code), etc.

A code portion may refer to a portion of a program (e.g., a program included in the document), such as one or more lines of program code, a string of one or more characters of program code, a set of strings of program code, a block of program code, a function, a method, a script, an object, etc., and/or any combination of these or other portions of a program. A non-code portion may refer to a non-code portion of a document, such as one or more text strings included in the document, one or more characters included in the document, one or more images included in the document, one or more videos embedded in the document, one or more results provided in the document, etc., and/or any combination of these or other non-code portions.

As further shown in FIG. 4, process 400 may include receiving information that identifies a code portion of the document (block 420), receiving information that identifies a non-code portion, of the document, that corresponds to the code portion (block 430), and receiving an indication to link the code portion and the non-code portion (block 440). For example, client device 210 may permit a user to manually link a code portion and a non-code portion. Additionally, or alternatively, client device 210 may automatically link a code portion and a non-code portion.

For manual linking of the code portion and the non-code portion, client device 210 may receive a user selection of the code portion and the corresponding non-code portion. For example, a user may interact with a user interface of client device 210 to identify the code portion. Such input may be provided by, for example, clicking on the code portion (e.g., using mouse input), touching the code portion (e.g., using a touch screen display), navigating to the code portion (e.g., using keyboard input), etc. Additionally, or alternatively, the user may select a code portion, and may interact with the user interface (e.g., via a button, a menu item, etc.) to indicate that the code portion is to be linked to a corresponding non-code portion. Similarly, the user may interact with the user interface in a similar manner to select the non-code portion that corresponds to the code portion.

The user may select the code portion and the non-code portion in any order. In some implementations, the user may select multiple code portions that correspond to a single non-code portion, and/or may select multiple non-code portions that correspond to a single code portion. Additionally, or alternatively, the user may select multiple code portions that correspond to multiple non-code portions, and/or may select multiple non-code portions that correspond to multiple code portions.

In some implementations, client device 210 may permit a user to activate or deactivate a linking mode. When the linking mode is activated, client device 210 may permit the user to easily create links between a code portion and a non-code portion, such as by performing consecutive interactions (e.g., clicks) with the code portion and the non-code portion. Additionally, or alternatively, the user may click on a first portion, drag the cursor to a second portion, and release the click to indicate that a link is to be formed between the first portion and the second portion.

Once the user has selected one or more code portions and one or more non-code portions that correspond to one another, the user may provide input that causes client device 210 to link the selected portions. For example, the user may interact with an input mechanism (e.g., a menu item, a link, a button, etc.) that causes client device 210 to link the selected portions.

For automatic linking of the code portion and the non-code portion, client device 210 may search the code and the non-code, included in the document, to identify corresponding portions. For example, client device 210 may search the code to identify text (e.g., a function name, a variable name, a variable value, an object name, a class name, an operator, etc.) that matches text included in the non-code. Additionally, or alternatively, client device 210 may search the code to identify text that matches a file name of an object included in the non-code. For example, an image in the non-code may be associated with a particular file name, and client device 210 may determine that the file name (or a portion of the file name) matches text included in the code.

Additionally, or alternatively, client device 210 may obtain a data structure that identifies corresponding code and non-code portions, and may use information identified in the data structure to search for corresponding portions. For example, the data structure may indicate that an equal sign (e.g., "=") corresponds to the word "equals." In this case, client device 210 may search the code to identify an equal sign, and may search the non-code for the corresponding word "equals." Other example operators that may be linked to text include × (e.g., times, multiply, multiplied by, etc.), / (e.g., divide, divided by, etc.), + (e.g., plus, add, sum, etc.), − (e.g., minus, subtract, etc.), > (e.g., greater than), < (e.g., less than), >= (e.g., greater than or equal to), <= (e.g., less than or equal to), or the like.

Client device 210 may obtain a set of rules that control the automatic linking process, in some implementations. For example, the set of rules may specify how closely two or more portions must match before being linked (e.g., an exact match, a case-sensitive match, a case-insensitive match, a quantity of characters permitted to differ, a Levenshtein distance between two strings, etc.). Additionally, or alternatively, client device 210 may determine corresponding portions of the document based on a proximity of the portions within the document. For example, text included in a programming comment that directly precedes a particular line of code is more likely to be associated with the particular line of code than a comment that appears thirty lines after the particular line of code. The set of rules may specify how proximate two or more portions must be before being linked (e.g., included in consecutive sections of the document, a permitted quantity of intervening sections, a permitted quantity of intervening characters, etc.).

In some implementations, client device 210 may partition the document into sections. For example, client device 210 may include a code portion and a non-code portion in different sections. A section of code may include, for example, a line of code, a block of code, a function, etc. Additionally, or alternatively, client device 210 may analyze the document to identify white space (e.g., two or more carriage returns between lines of text), different text styles (e.g., different fonts, different text sizes, different paragraph styles, etc.), headings (e.g., based on a rich text format, a markup language, etc.), etc., and may use this information to partition the document into sections. Client device 210 may link corresponding portions if the corresponding portions are within a threshold quantity of consecutive sections (e.g., if a quantity of intervening sections, between corresponding sections that include the corresponding portions, satisfies a threshold).

Client device 210 may calculate a linkage score based on one or more factors (e.g., a degree to which portions match, a proximity of portions, etc.), in some implementations. For example, client device 210 may calculate the linkage score by combining multiple factor scores associated with respective multiple factors. Client device 210 may calculate the linkage score by applying a same weight to different factor scores, or by applying a different weight to different factor scores. Client device 210 may compare one or more factor scores and/or a linkage score to a threshold, and may determine whether to link portions of the document based on whether the factor score(s) and/or the linkage score satisfies the threshold.

In some implementations, client device 210 may prompt the user to confirm a link (e.g., based on performing an automatic link determination). For example, client device 210 may provide an indication of a code portion and a corresponding non-code portion (e.g., via a user interface), and may provide a prompt that asks the user to confirm whether the portions are to be linked. If the user provides input indicating that the portions are to be linked, then client device 210 may link the portions. If the user provides input indicating that the portions are not to be linked, then client device 210 may prevent the portions from being linked. In some implementations, one or more corresponding portions of the document may be linked via a manual linking process, and one or more corresponding portions of the document may be linked via an automatic linking process.

As further shown in FIG. 4, process 400 may include linking the code portion and the non-code portion (block 450). For example, client device 210 may link the code portion and the corresponding non-code portion based on receiving the indication to link the corresponding portions. Client device 210 may link the code portion and the non-code portion by storing, in a data structure, an indication of a link between the corresponding portions. Client device 210 may store the data structure locally, and/or may provide the data structure to another device (e.g., server device 230) for remote storage. Client device 210 may perform process 400 multiple times to store multiple link indicators that indicate links between multiple respective code portions and non-code portions.

Additionally, or alternatively, client device 210 may provide a link indicator for display via a user interface of client device 210. The link indicator may indicate that a code portion and a non-code portion have been linked. In this way, code portions and non-code portions may be linked for further processing, as described herein in connection with FIGS. 7 and 9.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
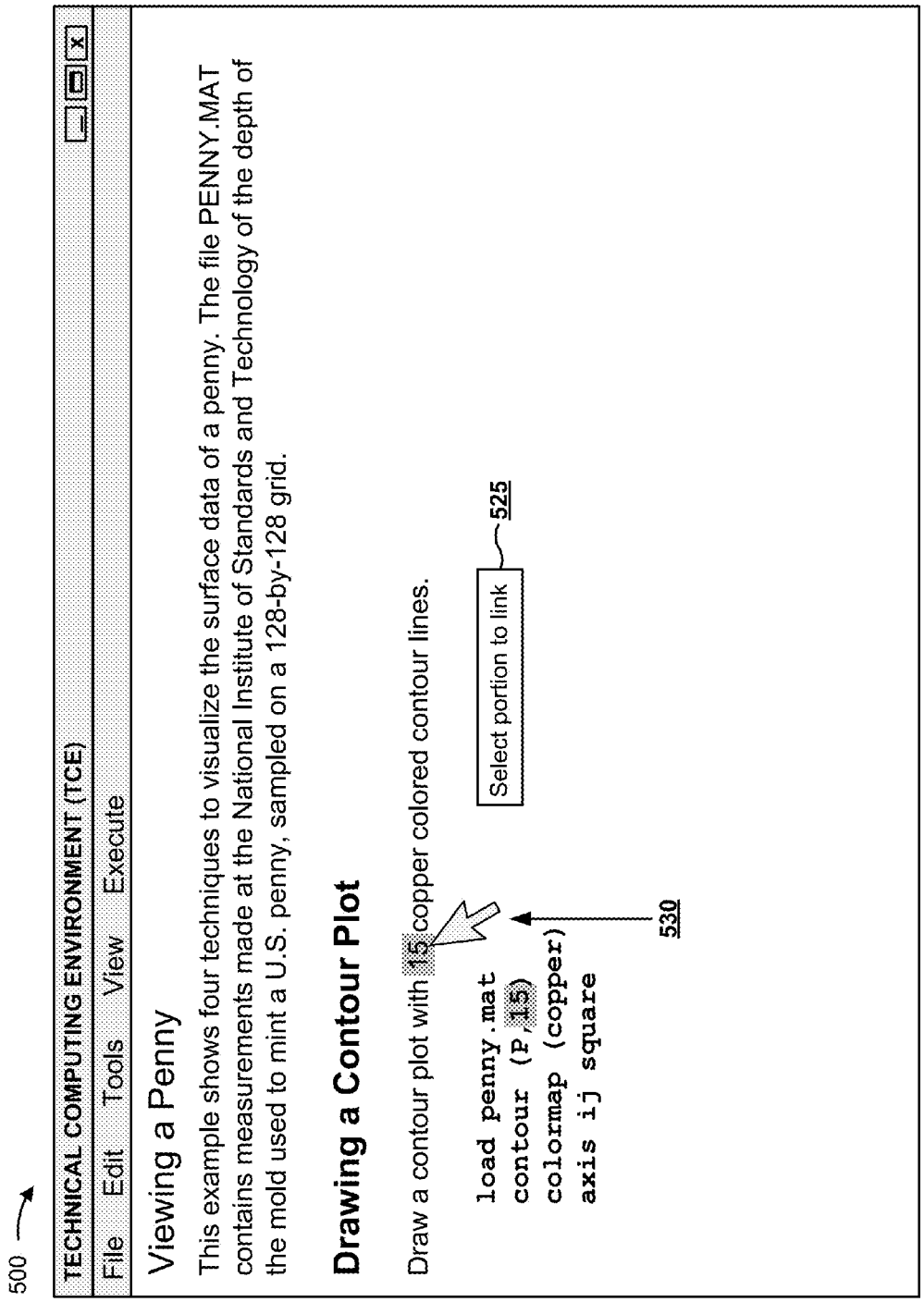
Figure 5C:
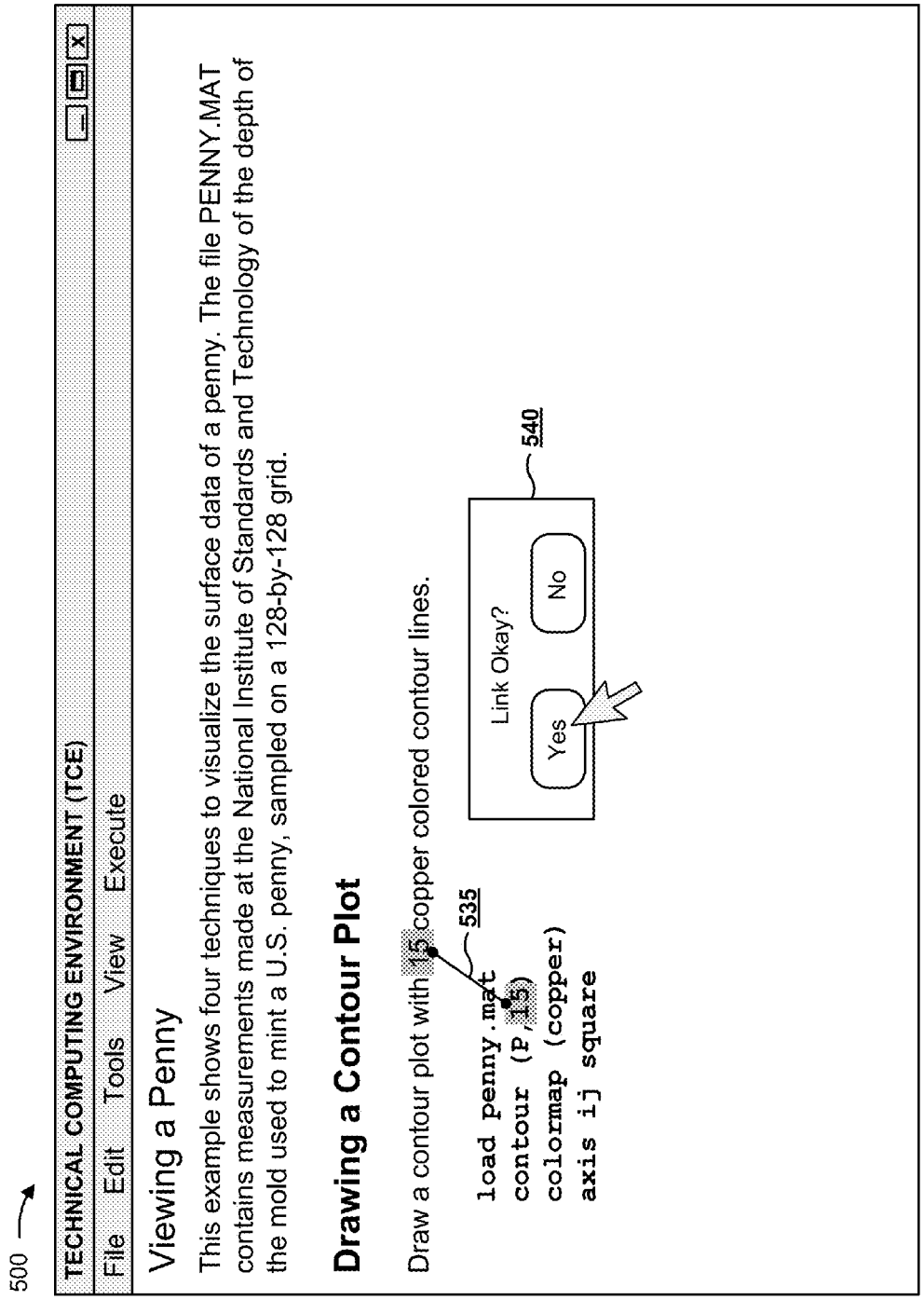

FIGS. 5A-5C are diagrams of an example implementation 500 relating to example process 400 shown in FIG. 4. FIGS. 5A-5C show an example of manually linking code and non-code in a programming environment.

As shown in FIG. 5A, assume that a user has interacted with TCE 220, executing on client device 210, to input non-code text into a document, and to input code text into the document. The non-code is shown by reference number 505, and the code is shown by reference number 510. As shown by reference number 515, assume that the user selects a code portion, shown as "15," which represents a value of a variable input to a contour function. As shown by reference number 520, assume that the user right-clicks on the number "15," which causes a menu to be provided. Finally, assume that the user selects a "Create Link" menu item from the menu.

As shown in FIG. 5B, and by reference number 525, assume that user selection of the "Create Link" menu item causes client device 210 to prompt the user to select a non-code portion to link to the selected code portion. As shown by reference number 530, assume that the user selects the number "15" included in the text of the non-code portion.

As shown in FIG. 5C, and by reference number 535, assume that client device 210 provides a link indicator for display. The link indicator indicates a link between the number "15" in the code and the number "15" in the non-code. As shown by reference number 540, client device 210 may prompt the user to confirm the link. Assume that the user confirms the link, and that client device 210 stores an indication that the selected code portion and the selected non-code portion are linked.

As indicated above, FIGS. 5A-5C are provided merely as an example. Other examples are possible and may differ from what was described with regard to FIGS. 5A-5C.

Figure 6A:
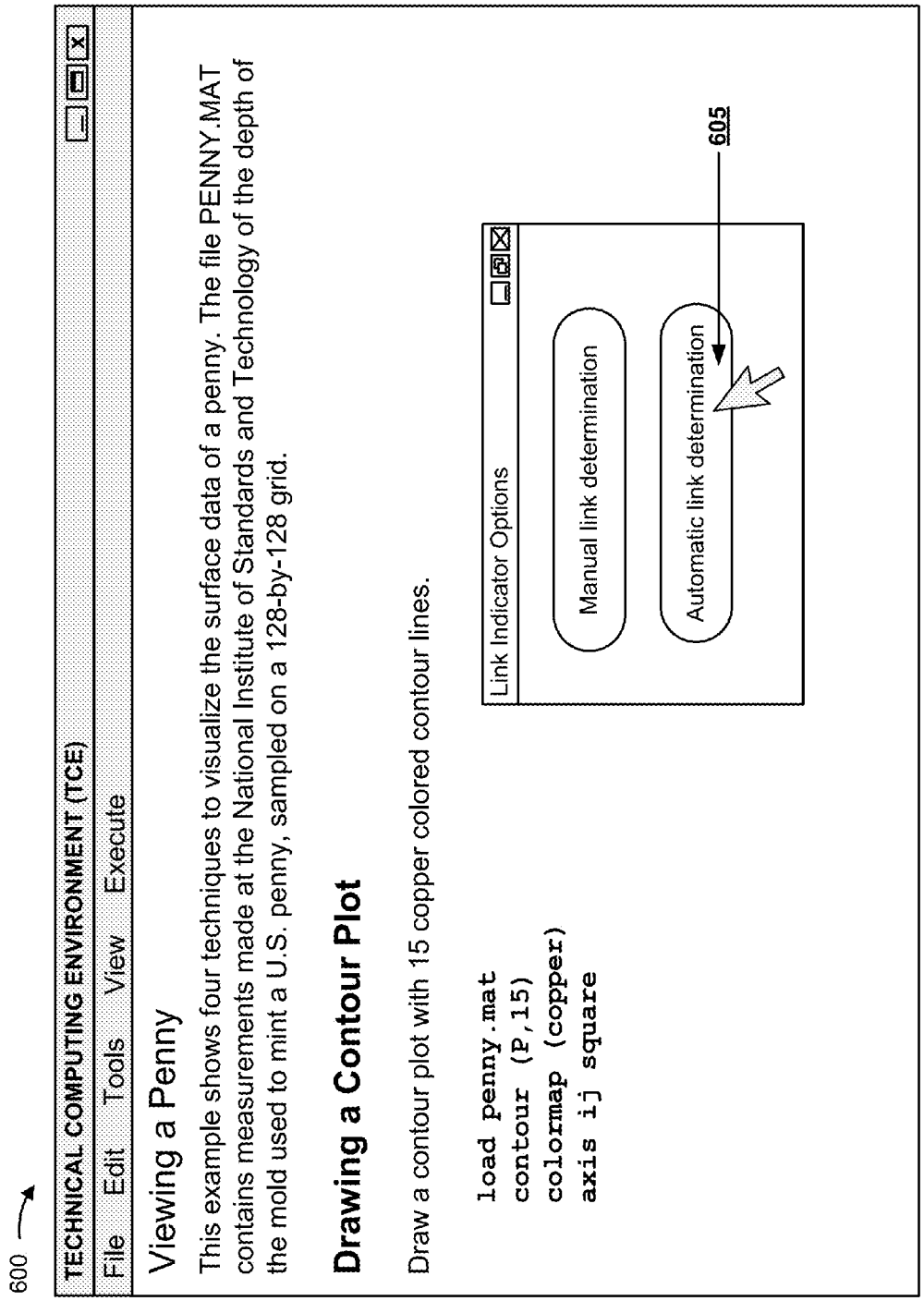
FIGS. 6A and 6B are diagrams of another example implementation relating to the example process shown in FIG. 4.
Figure 6B:
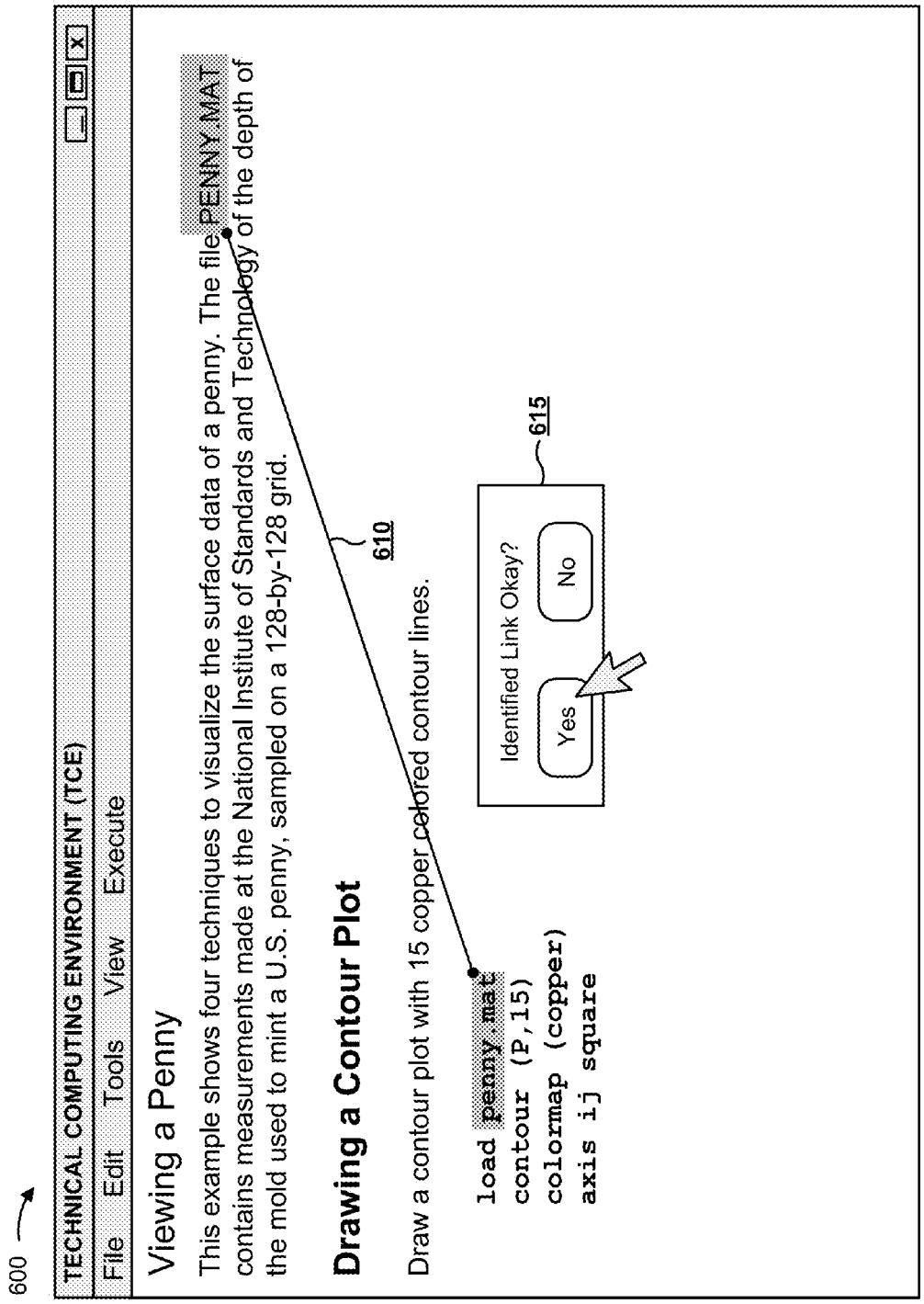

FIGS. 6A and 6B are diagrams of another example implementation 600 relating to example process 400 shown in FIG. 4. FIGS. 6A and 6B show an example of automatically linking code and non-code in a programming environment. For the purpose of FIGS. 6A and 6B, assume that the user and client device 210 have carried out the operations described above in connection with example implementation 500 of FIGS. 5A-5C.

As shown in FIG. 6A, and by reference number 605, assume that the user interacts with TCE 220 to provide an indication to perform an automatic link determination. As shown in FIG. 6B, based on the user interaction, assume that client device 210 searches the code and the non-code to identify portions with matching text. As shown by reference number 610, client device 210 determines that the text "PENNY.MAT" in the non-code matches the text "penny.mat" in the code, and provides a link indicator indicating that the portions correspond. As shown by reference number 615, assume that client device 210 prompts the user to confirm the link. Assume that the user confirms the link, and that client device 210 stores an indication that the determined code portion and the determined non-code portion are linked.

As indicated above, FIGS. 6A and 6B are provided merely as an example. Other examples are possible and may differ from what was described with regard to FIGS. 6A and 6B.

Figure 7:
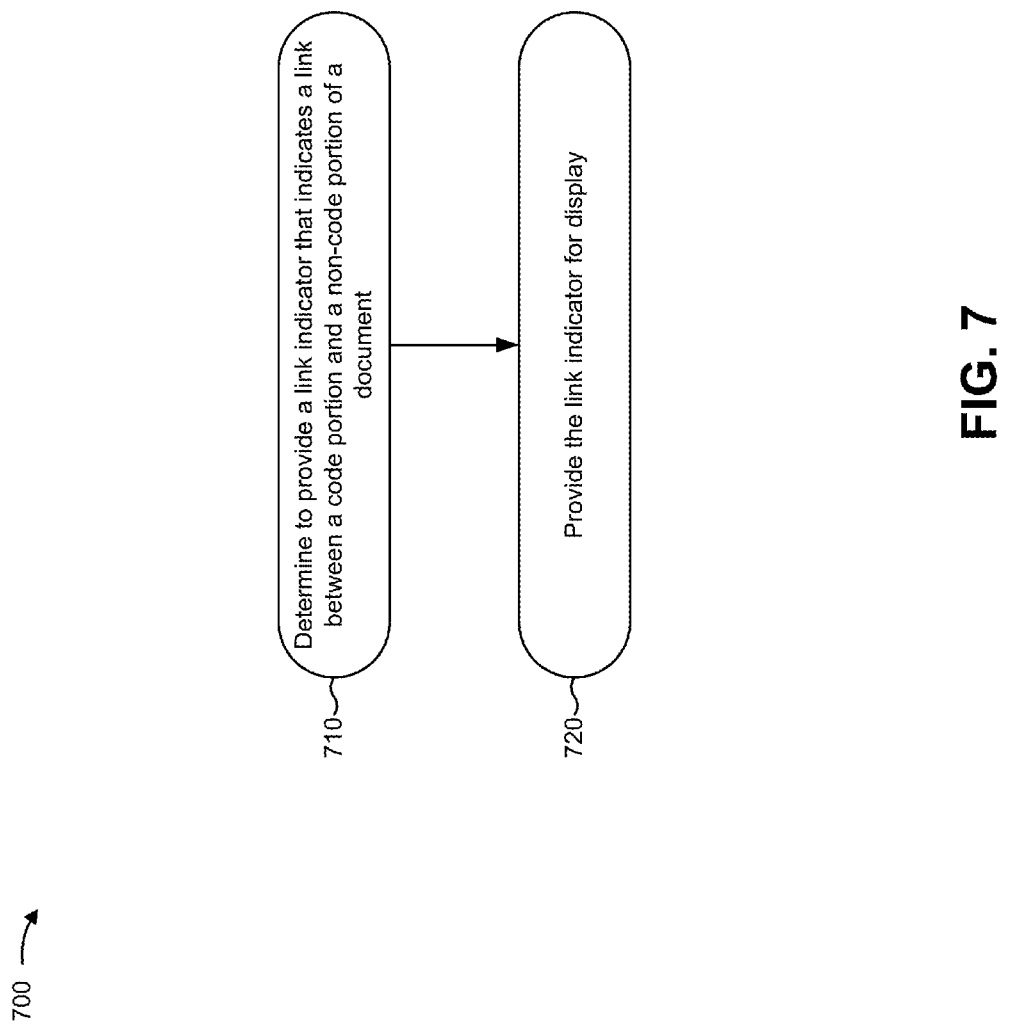
FIG. 7 is a flow chart of an example process for providing a link indicator associated with a link between code and non-code.

FIG. 7 is a flow chart of an example process 700 for providing a link indicator associated with a link between code and non-code. In some implementations, one or more process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include determining to provide a link indicator that indicates a link between a code portion and a non-code portion of a document (block 710), and providing the link indicator for display (block 720). For example, client device 210 may determine to provide a link indicator based on input received from a user and/or from another device. As an example, a user may interact with a user interface of client device 210 to toggle between showing (e.g., displaying) link indicators on the user interface and hiding (e.g., not displaying) link indicators on the user interface. Additionally, or alternatively, the user may use the user interface to select a linked portion (e.g., by clicking the linked portion, mousing over the linked portion, navigating a cursor to the linked portion, etc.), which may cause client device 210 to show a link indicator associated with the selected linked portion.

Client device 210 may provide a link indicator by providing a first indicator, associated with a code portion, and a second indicator, associated with a corresponding non-code portion, in the same manner. For example, client device 210 may highlight the corresponding portions (e.g., using a same color), may outline the corresponding portions (e.g., using a same color, line weight, line style, etc.), may mark the corresponding portions (e.g., using a same number, letter, character, symbol, etc.), or the like. Additionally, or alternatively, client device 210 may provide a link indicator by connecting the corresponding portions (e.g., by displaying a line that connects the corresponding portions on the user interface). In some implementations, client device 210 may provide different link indicators (e.g., associated with different linked portions), in a different manner (e.g., using a different color, a different line style, a different marking, etc.).

Client device 210 may show or hide a link indicator for a particular type of link, in some implementations. A type of link may include, for example, a one-to-one link (e.g., one code portion corresponding to one non-code portion), a one-to-many link (e.g., one code portion corresponding to multiple non-code portions, or one non-code portion corresponding to multiple code portions), a manually-generated link (e.g., a link formed based on performing a manual linking process, as described elsewhere herein), an automatically-generated link (e.g., a link formed based on performing an automatic linking process, as described elsewhere herein), a link formed based on a match (e.g., a match between text included in the corresponding portions), a link formed based on a data structure (e.g., a match between portions identified as being associated in a data structure), etc.

Additionally, or alternatively, client device 210 may provide a sequence of link indicators for display in a particular order. The particular order may correspond to an order in which linked code portions appear in the document (e.g., from beginning to end, top to bottom, left to right, etc.), an order in which linked non-code portions appear in the document, etc. For example, client device 210 may provide a first link indicator for display, and may hide one or more other link indicators (e.g., all other link indicators). The first link indicator may indicate a link between a first code portion and a first non-code portion that appear near the top of the document. Client device 210 may receive an indication to show a next link (e.g., based on user input). Based on receiving the indication, client device 210 may hide the first link indicator, and may show a second link indicator. The second link indicator may indicate a link between a second code portion and a second non-code portion that appear further down in the document than the first code portion and the first non-code portion.

In this way, a user may easily see links between code portions and non-code portions, and may navigate through the links in various ways.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIGS. 8A-8D are diagrams of an example implementation 800 relating to example process 700 shown in FIG. 7. FIGS. 8A-8D show examples of providing various link indicators associated with links between code and non-code. For the purpose of FIGS. 8A-8D, assume that the user and client device 210 have carried out the operations described above in connection with example implementation 500 of FIGS. 5A-5C and example implementation 600 of FIGS. 6A and 6B.

Figure 8A:
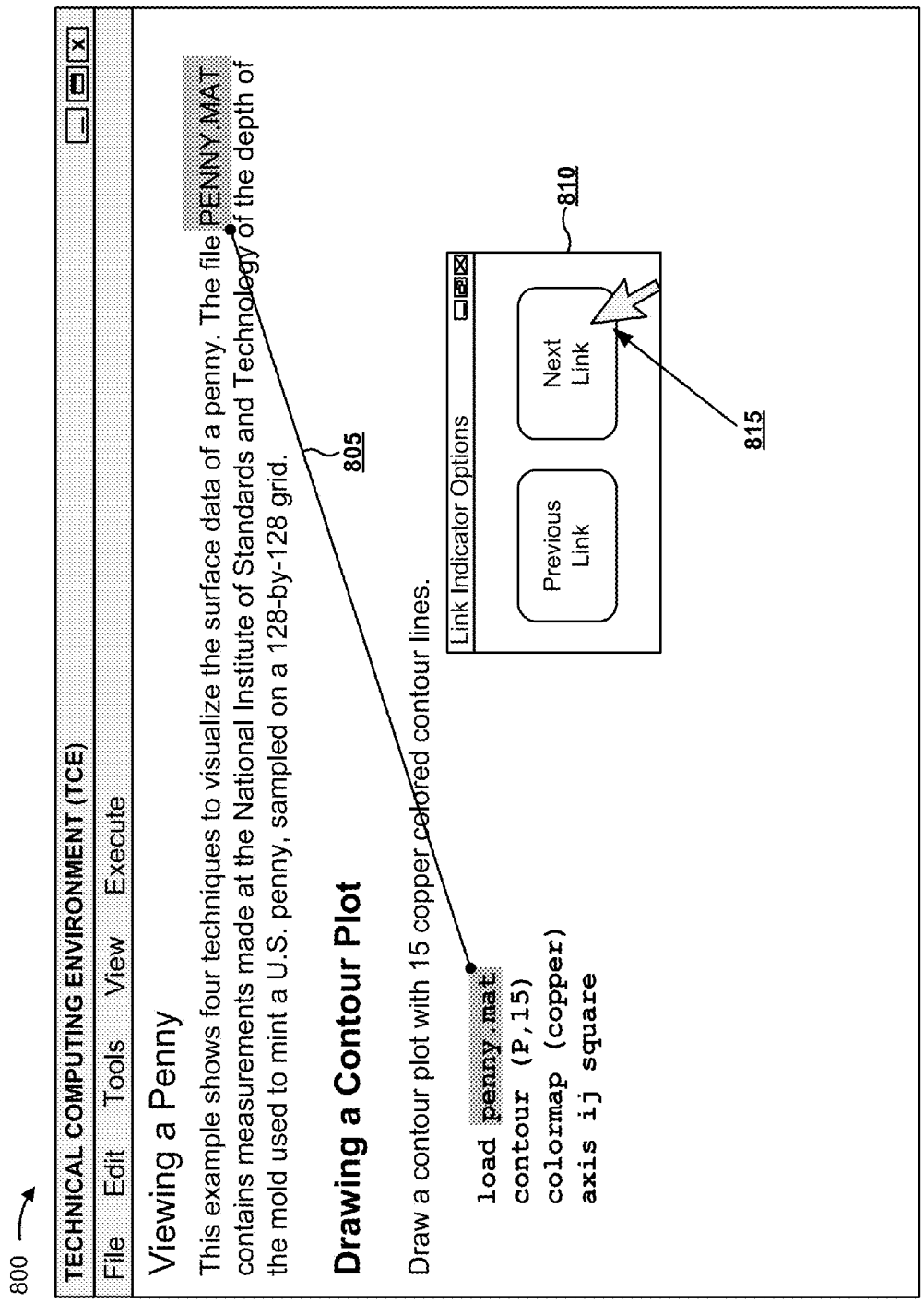
FIGS. 8A-8D are diagrams of an example implementation relating to the example process shown in FIG. 7.

As shown in FIG. 8A, assume that the user has interacted with client device 210 to cause client device 210 to provide a link indicator for display. As shown by reference number 805, assume that client device 210 displays a first link indicator associated with the text "penny.mat." For example, client device 210 highlights a code portion (e.g., "penny.mat") and a corresponding non-code portion (e.g., "PENNY.MAT") using the same color, and displays a line connecting the corresponding portions. Assume that client device 210 provides this link indicator first because the code portion that includes the text "penny.mat" is the first linked code portion in the document (e.g., appears closest to the top of the document). As shown by reference number 810, assume that client device 210 provides an input mechanism that permits the user to navigate through a sequence of link indicators. As shown by reference number 815, assume that the user provides input that causes client device 210 to provide a next link indicator.

Figure 8B:
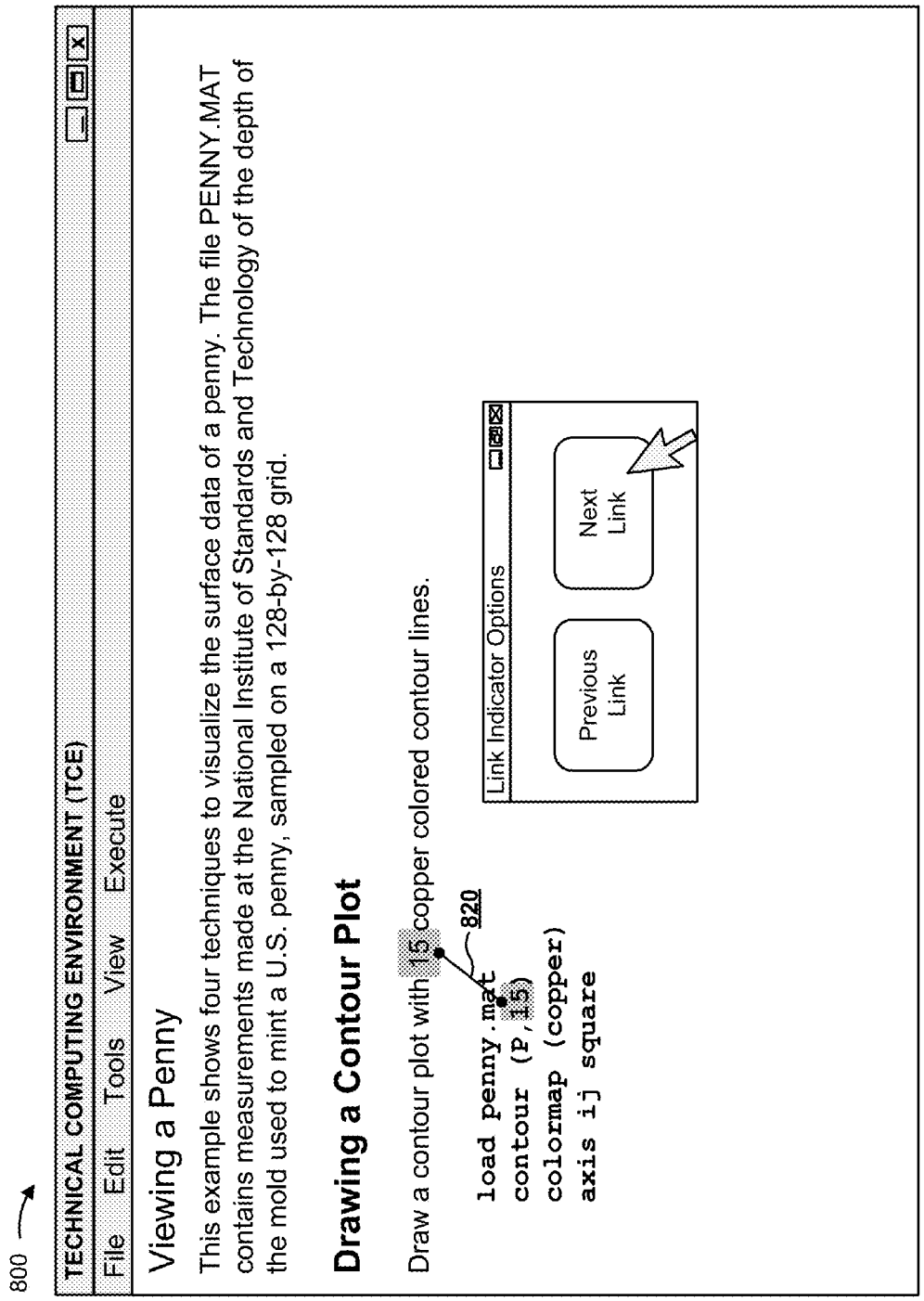

As shown in FIG. 8B, based on the user input, client device 210 hides the first link indicator. Further, as shown by reference number 820, assume that client device 210 displays a second link indicator associated with the text "15." For example, client device 210 highlights a code portion (e.g., "15") and a corresponding non-code portion (e.g., "15") using the same color, and displays a line connecting the corresponding portions. Assume that client device 210 provides this link indicator second because the code portion that includes the text "15" is the second linked code portion in the document (e.g., appears next closest to the top of the document, after the first linked code portion of "penny.mat").

Figure 8C:
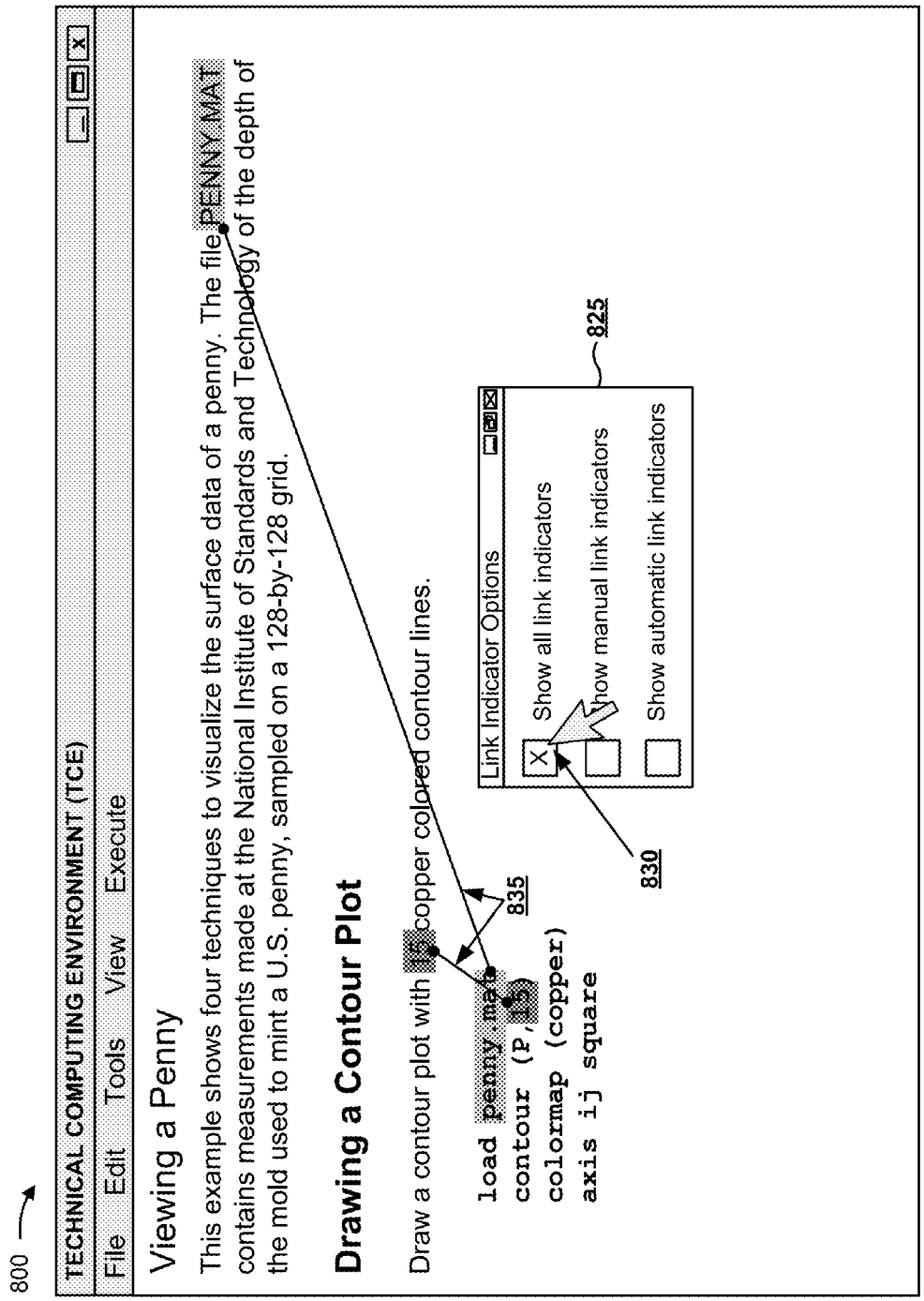

As shown in FIG. 8C, and by reference number 825, client device 210 may provide an input mechanism that permits the user to show or hide different types of link indicators. For example, the user may choose to show all link indicators, to show link indicators determined based on a manual linking process, to show link indicators determined based on an automatic linking process, etc. As shown by reference number 830, assume that the user selects to show all link indicators. As shown by reference number 835, based on the user selection, client device 210 provides both the first link indicator and the second link indicator for display. Client device 210 may provide the first link indicator in a different manner (e.g., a different color) than the second link indicator.

Figure 8D:
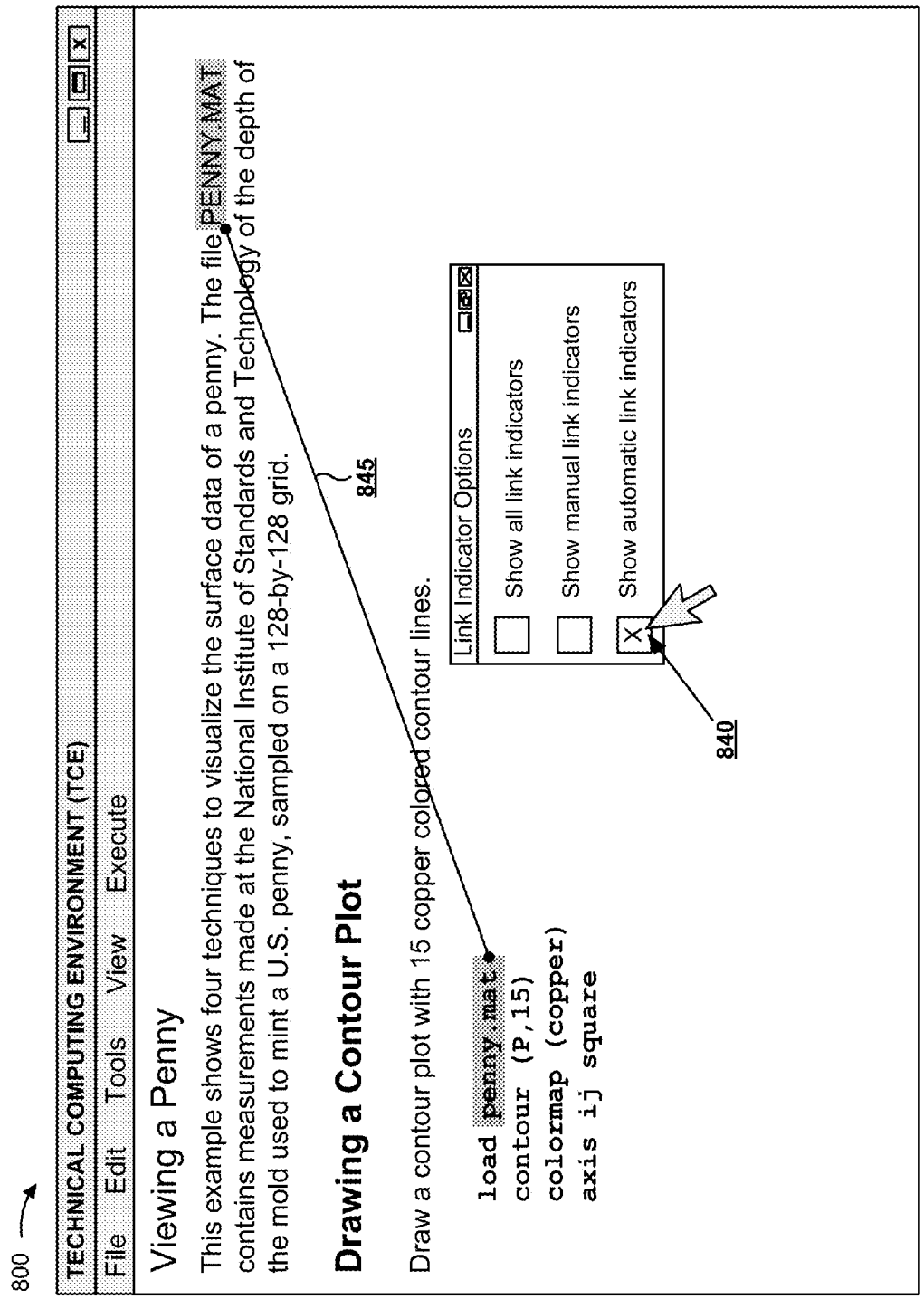

As shown in FIG. 8D, and by reference number 840, assume that the user selects to show only link indicators determined based on an automatic linking process. As shown by reference number 845, based on the user selection, client device 210 hides the second link indicator associated with the text "15" (e.g., determined based on the manual linking process described above in connection with FIGS. 5A-5C), and continues to show the first link indicator associated with the text "penny.mat" (e.g., determined based on the automatic linking process described above in connection with FIGS. 6A and 6B).

As indicated above, FIGS. 8A-8D are provided merely as an example. Other examples are possible and may differ from what was described with regard to FIGS. 8A-8D.

FIG. 9 is a flow chart of an example process 900 for modifying linked code based on a change to corresponding non-code, or modifying linked non-code based on a change to corresponding code. In some implementations, one or more process blocks of FIG. 9 may be performed by client device 210. In some implementations, one or more process blocks of FIG. 9 may be performed by another device or a group of devices separate from or including client device 210, such as server device 230.

As shown in FIG. 9, process 900 may include detecting a change to a first linked portion of a document (block 910), and modifying a second linked portion, of the document, that corresponds to the first linked portion (block 920). For example, client device 210 may detect a change to a code portion, and may modify a non-code portion that corresponds to the code portion. Additionally, or alternatively, client device 210 may detect a change to a non-code portion, and may modify a code portion that corresponds to the non-code portion.

Client device 210 may detect a change to a first linked portion by determining that text included in the first linked portion has changed, in some implementations. For example, a user may interact with a user interface of client device 210 to modify the text of the first linked portion (e.g., by inserting text, removing text, modifying text, etc.). Based on detecting the change to the first linked portion, client device 210 may modify a second linked portion that is linked to the first linked portion.

As an example, when the first linked portion matches the second linked portion, client device 210 may modify the second linked portion so that the text included in the second linked portion matches the modified text of the first linked portion. As another example, when the first linked portion and the second linked portion are linked based on a relationship identified in a data structure (e.g., as with "=" and "equals," "×" and "times" or "multiply," etc.), client device 210 may modify the second linked portion to display information identified in the data structure as sharing a relationship with the modified first linked portion. In some implementations, client device 210 may prompt a user to confirm a change to the second linked portion.

When the non-code portion is a result generated by executing the code portion, client device 210 may receive input that changes the result, and may modify the code portion based on the changed result. For example, client device 210 may generate and display an array based on executing a code portion. The user may interact with the array to change one or more values in the array. Client device 210 may detect this change, and may modify the code portion used to generate the array based on the change to the displayed array.

In some implementations, a user may provide input to delete a first linked portion and/or a link indicator associated with the first linked portion. In this case, client device 210 may delete the second linked portion (e.g., in addition to deleting the first linked portion and the link indicator). Client device 210 may remove, from a data structure, information identifying the link.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

FIGS. 10A-10F are diagrams of an example implementation 1000 relating to example process 900 shown in FIG. 9. FIGS. 10A-10F show an example of detecting a change to a first linked portion and modifying a second linked portion, that corresponds to the first linked portion, based on detecting the change. For the purpose of FIGS. 10A-10F, assume that the user and client device 210 have carried out the operations described above in connection with example implementation 500 of FIGS. 5A-5C and example implementation 600 of FIGS. 6A and 6B.

Figure 10A:
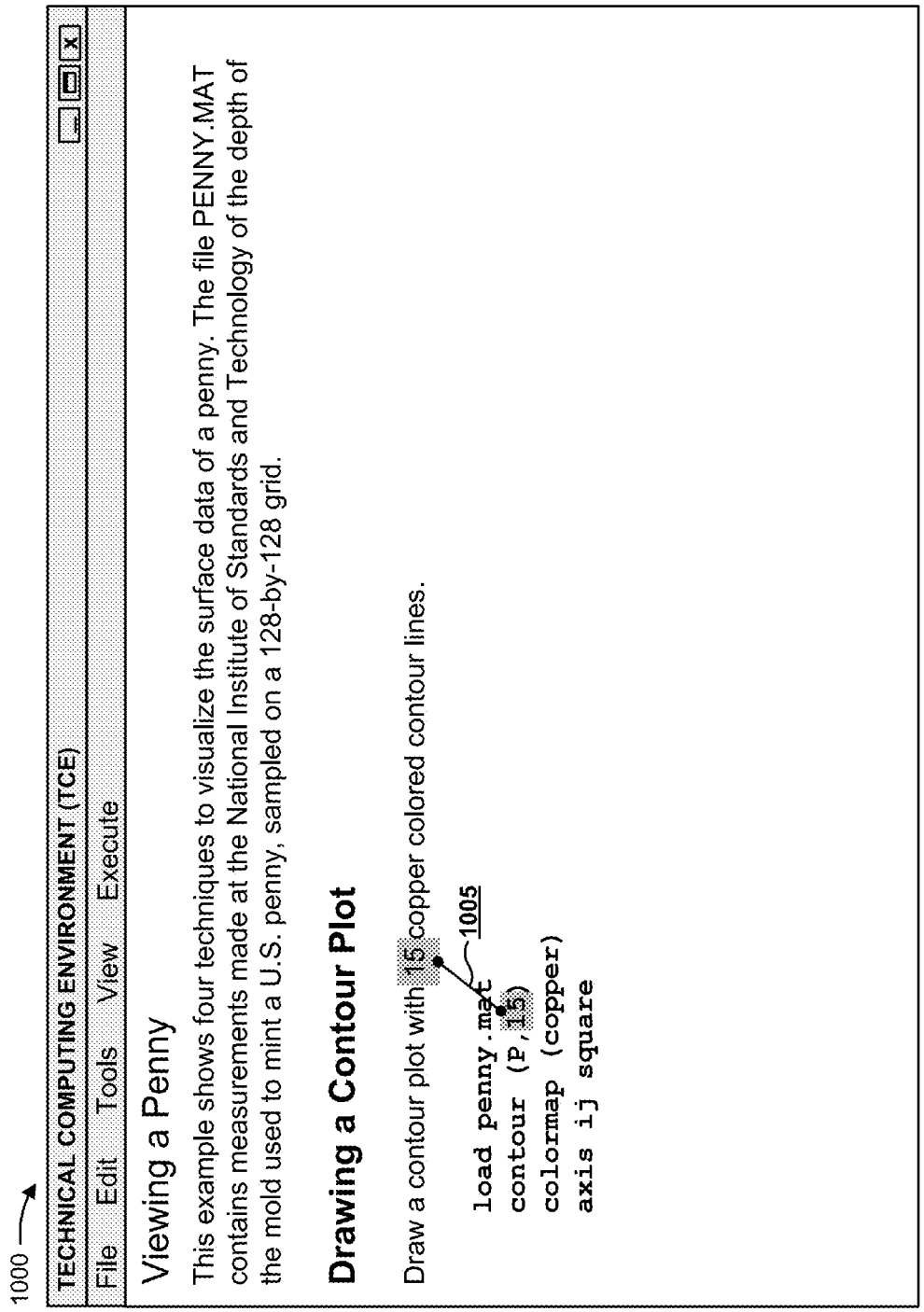
Figure 10B:
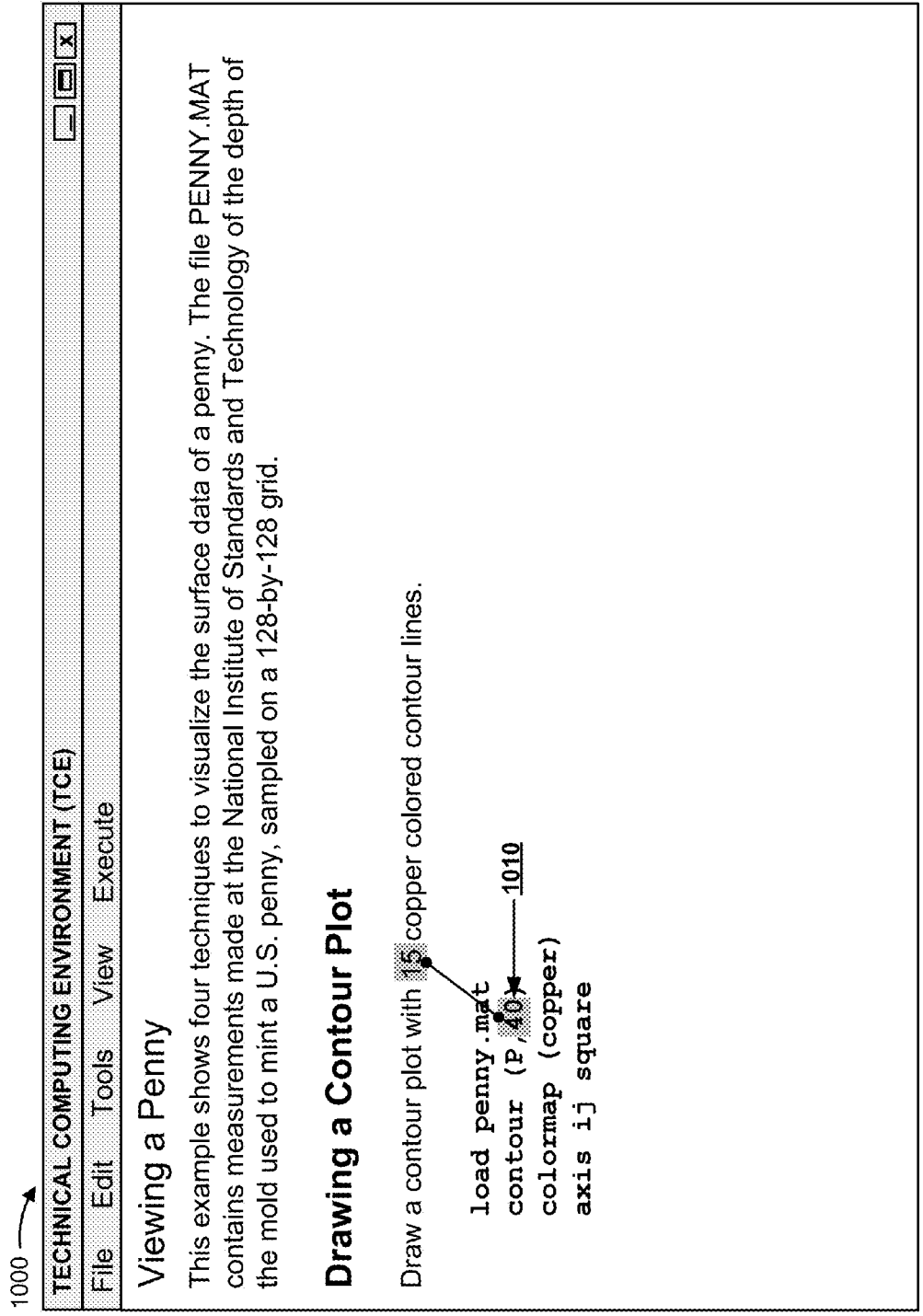
Figure 10C:
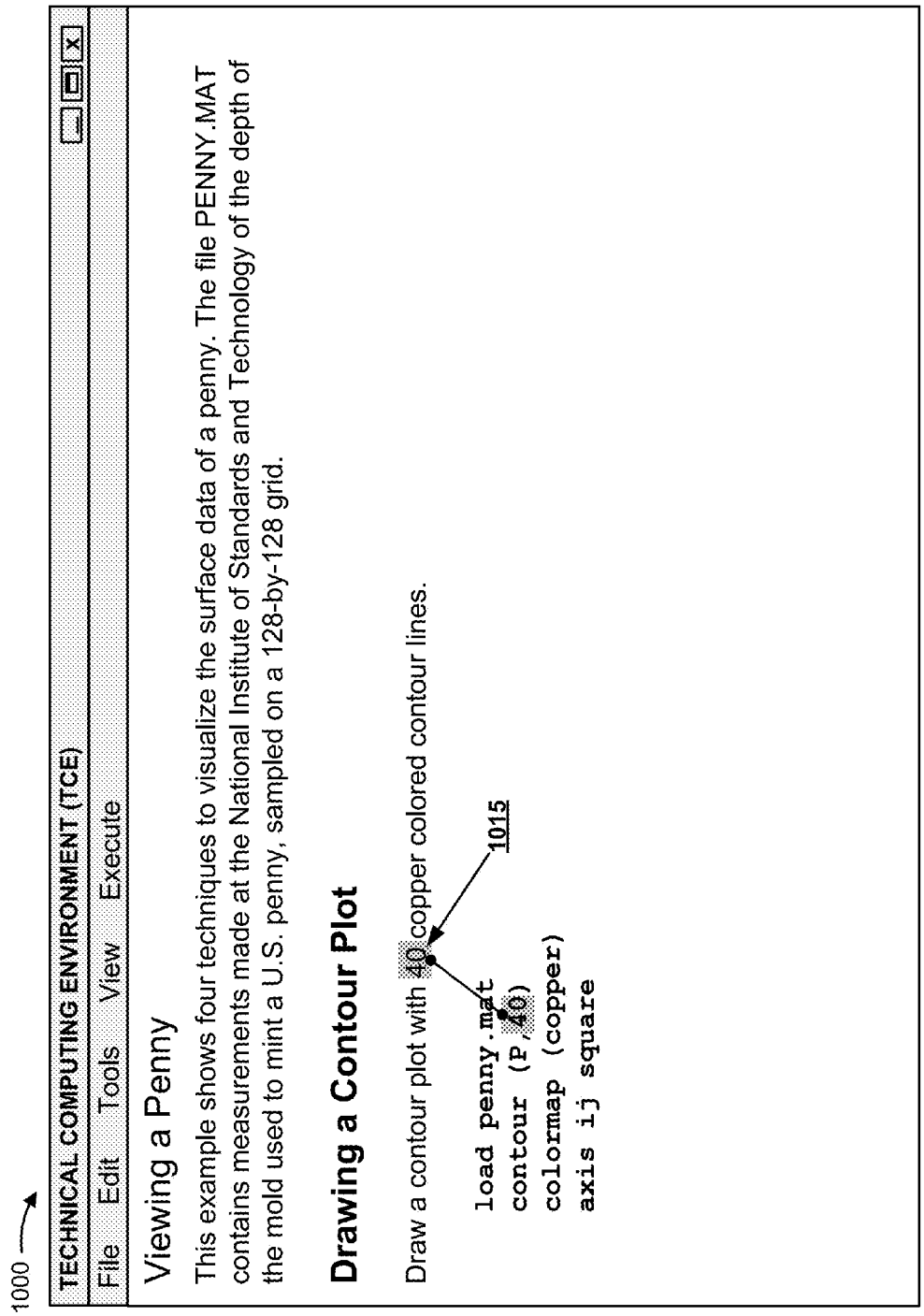

As shown in FIG. 10A, and by reference number 1005, assume that client device 210 has created a link between the text "15" in a code portion and the text "15" in a non-code portion. As shown in FIG. 10B, and by reference number 1010, assume that the user modifies the code portion to change the text from "15" to "40." As shown in FIG. 10C, and by reference number 1015, based on the change to the code portion, client device 210 modifies the non-code portion to change the text from "15" to "40."

Figure 10D:
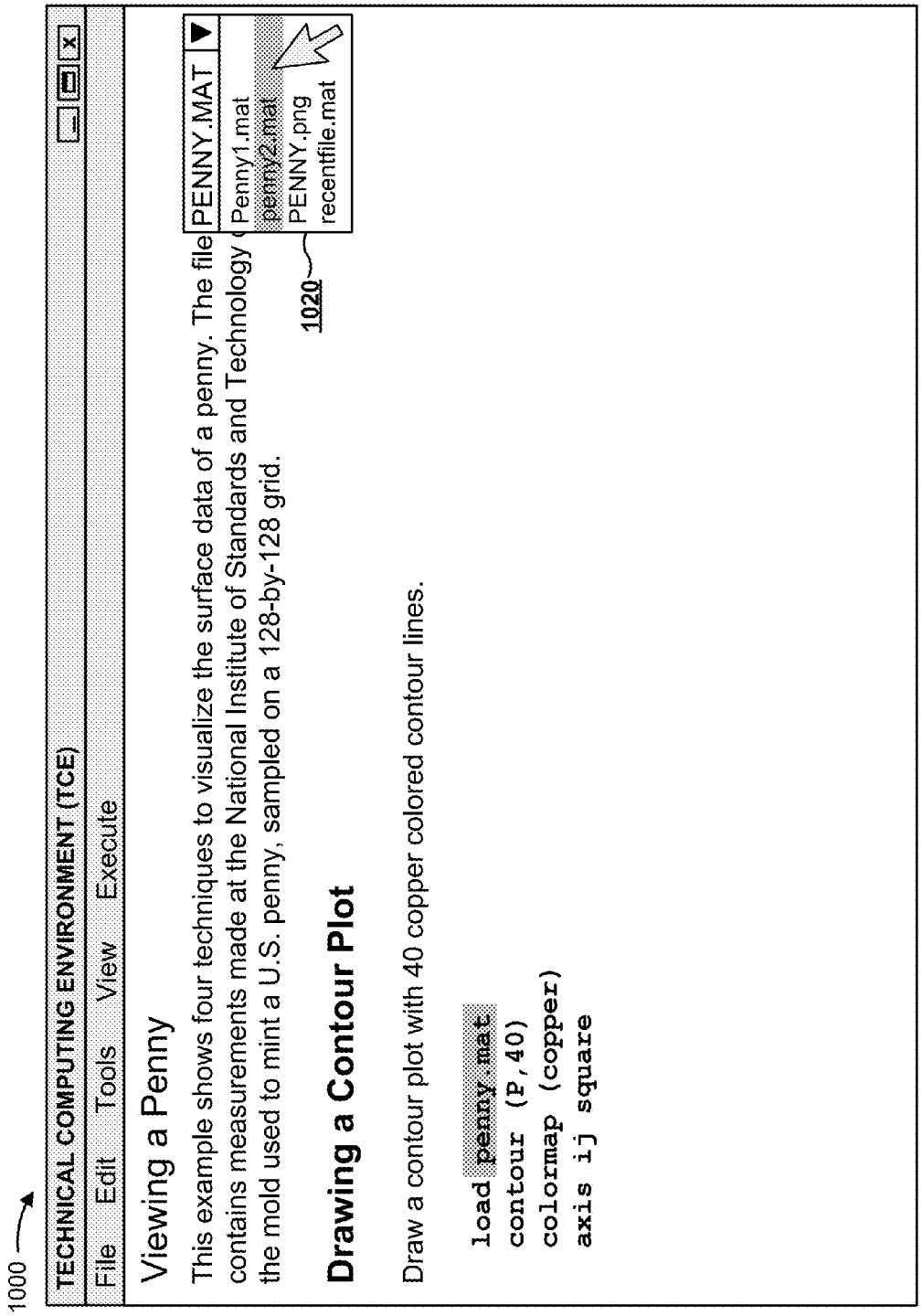

As shown in FIG. 10D, and by reference number 1020, assume that client device 210 provides an input mechanism for a user to modify a linked non-code portion. For example, assume that client device 210 provides a drop-down list associated with the "PENNY.MAT" text, and shows files related to the penny.mat file, recently used files, files stored in the same directory as "PENNY.MAT," files stored in the same directory as the program, files associated with a workspace of TCE 220, etc. For example, the drop-down list includes a "Penny1.mat" file, a "penny2.mat" file, a "PENNY.png" file, and a "recentfile.mat" file. As shown, assume that the user selects the "penny2.mat" file.

Figure 10E:
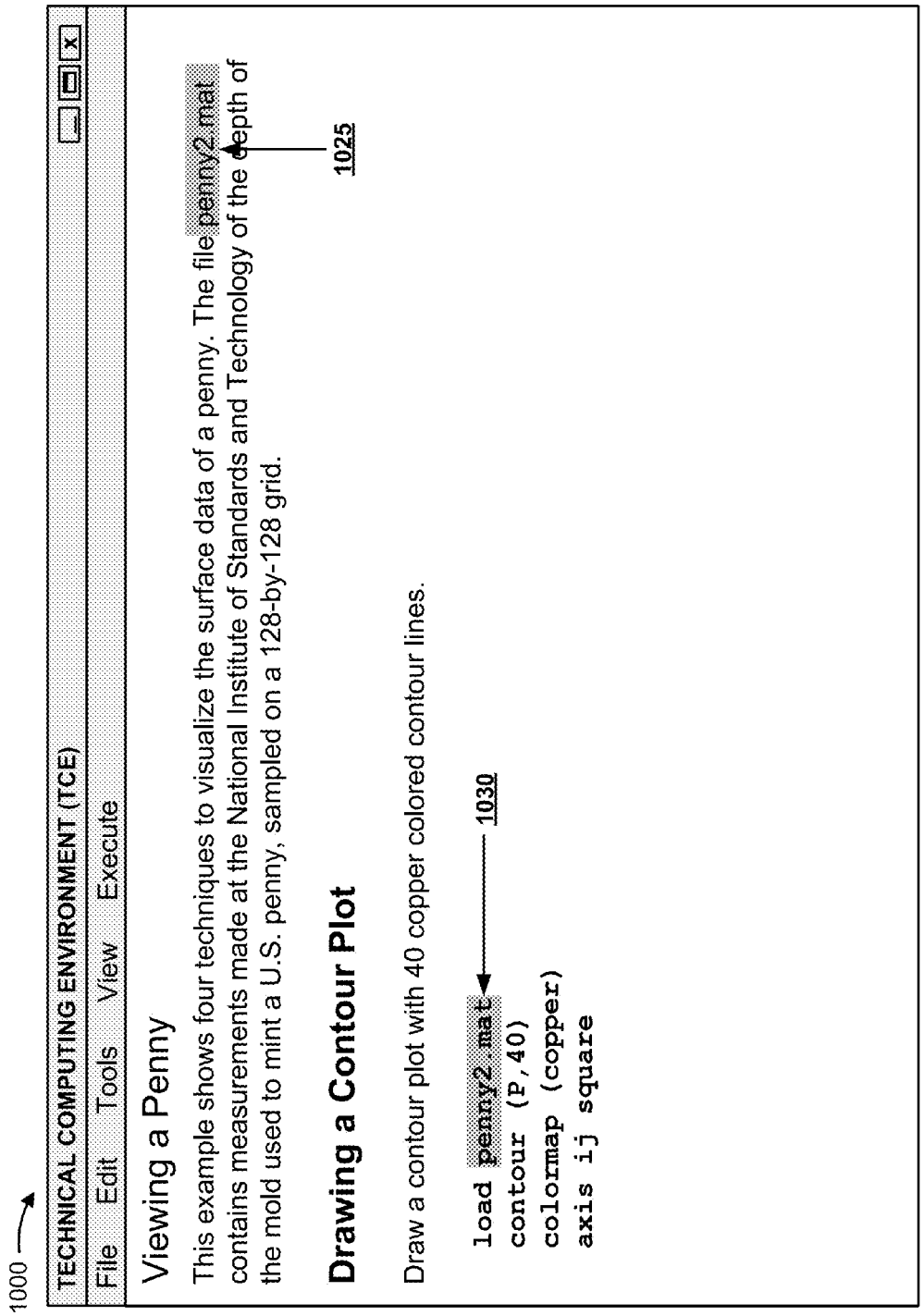

As shown in FIG. 10E, and by reference number 1025, user selection of the "penny2.mat" file causes the non-code text "PENNY.MAT" to be changed to "penny2.mat." Furthermore, as shown by reference number 1030, user selection of the "penny2.mat" file causes the code text "penny.mat" to be changed to "penny2.mat." Thus, when client device 210 executes the code, the code will execute using the "penny2.mat" file rather than the "penny.mat" file.

As shown in FIG. 10F, and by reference number 1035, assume that the user interacts with client device 210 to replace the "penny2.mat" text with an image, and that the image has a file name of "penny.png." Based on the user interaction, client device 210 may provide the image via the user interface, may link the image and the code portion corresponding to the image, and may change the code text "penny2.mat" to "penny.png," as shown by reference number 1040. In this way, client device 210 may synchronize a code portion and a non-code portion to prevent confusion (e.g., to prevent the explanation in the non-code portion from not matching information in the code portion).

As indicated above, FIGS. 10A-10F are provided merely as an example. Other examples are possible and may differ from what was described with regard to FIGS. 10A-10F.

FIGS. 11A-11G are diagrams of an example implementation 1100 relating to example process 400 shown in FIG. 4 and example process 900 shown in FIG. 9. FIGS. 11A-11G show examples of linking different types of code and non-code portions, and modifying a linked portion based on detecting a change to another linked portion.

As shown in FIG. 11A, assume that the user interacts with a user interface (e.g., via TCE 220) of client device 210 to input code associated with a domath function, and to input non-code used to explain the domath function. As shown by reference number 1105, assume that the user interacts with an input mechanism to cause client device 210 to perform an automatic linking operation.

Figure 11B:
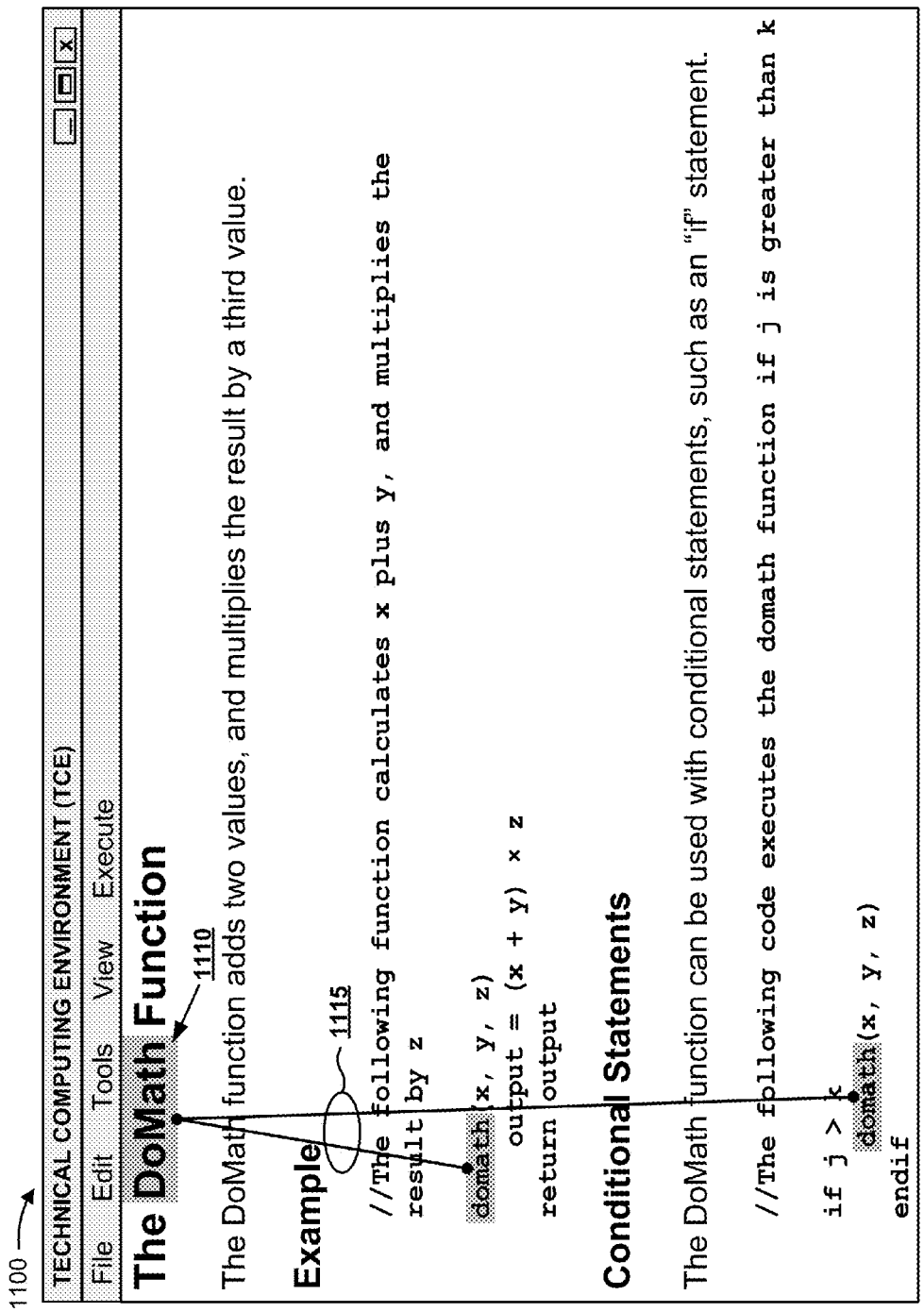

As shown in FIG. 11B, assume that client device 210 searches the code and non-code to identify matching text. As shown by reference number 1110, assume that client device 210 determines that non-code text in a title of the document, shown as "DoMath," matches code text in two different sections of the document. As shown by reference number 1115, assume that client device 210 links the non-code title text "DoMath" with each code text "domath" in the different sections. Client device 210 may link the corresponding portions in this manner based on a rule that specifies that the non-code title section applies to code in the entire document.

As shown in FIG. 11C, and by reference number 1120, assume that client device 210 links non-code "DoMath" text in a top non-code section of the document with code "domath" text in a top code section of the document. Similarly, as shown by reference number 1125, assume that client device 210 links non-code "DoMath" text in a bottom non-code section of the document with code "domath" text in a bottom code section of the document. Client device 210 may not link the non-code "DoMath" text in the top non-code section with the code "domath" text in the bottom code section based on a rule, for example, that specifies that code is only to be linked to non-code in an immediately preceding section. As further shown in FIG. 11C, client device 210 may link other code portions and non-code portions, such as the variable values of x, y, z, j, and k.

Figure 11D:

As shown in FIG. 11D, and by reference number 1130, client device 210 may obtain a data structure that identifies code text that is to be linked to non-code text. For example, the data structure identifies that a plus sign (+) in the code is to be linked to various non-code text, such as "add," "adds," "plus," or the like. As shown by reference number 1135, client device 210 links a plus sign (+) in the code to the text "adds" and "plus" in the preceding non-code. As shown by reference number 1140, client device 210 links a multiplication sign (×) in the code to two occurrences of the text "multiplies" in the preceding non-code. As shown by reference number 1145, client device 210 links a greater than sign (>) in the code to the text "greater than" in the preceding non-code.

As shown in FIG. 11E, and by reference number 1150, assume that the user edits three linked portions. First, assume that the user replaces the text "multiplies" with the text "divides" in the top non-code section. Second, assume that the user replaces the plus sign (+) in the top code section with a minus sign (−). Third, assume that the user replaces the text "greater than" in the bottom non-code section (e.g., a comment) with the text "less than."

Figure 11F:
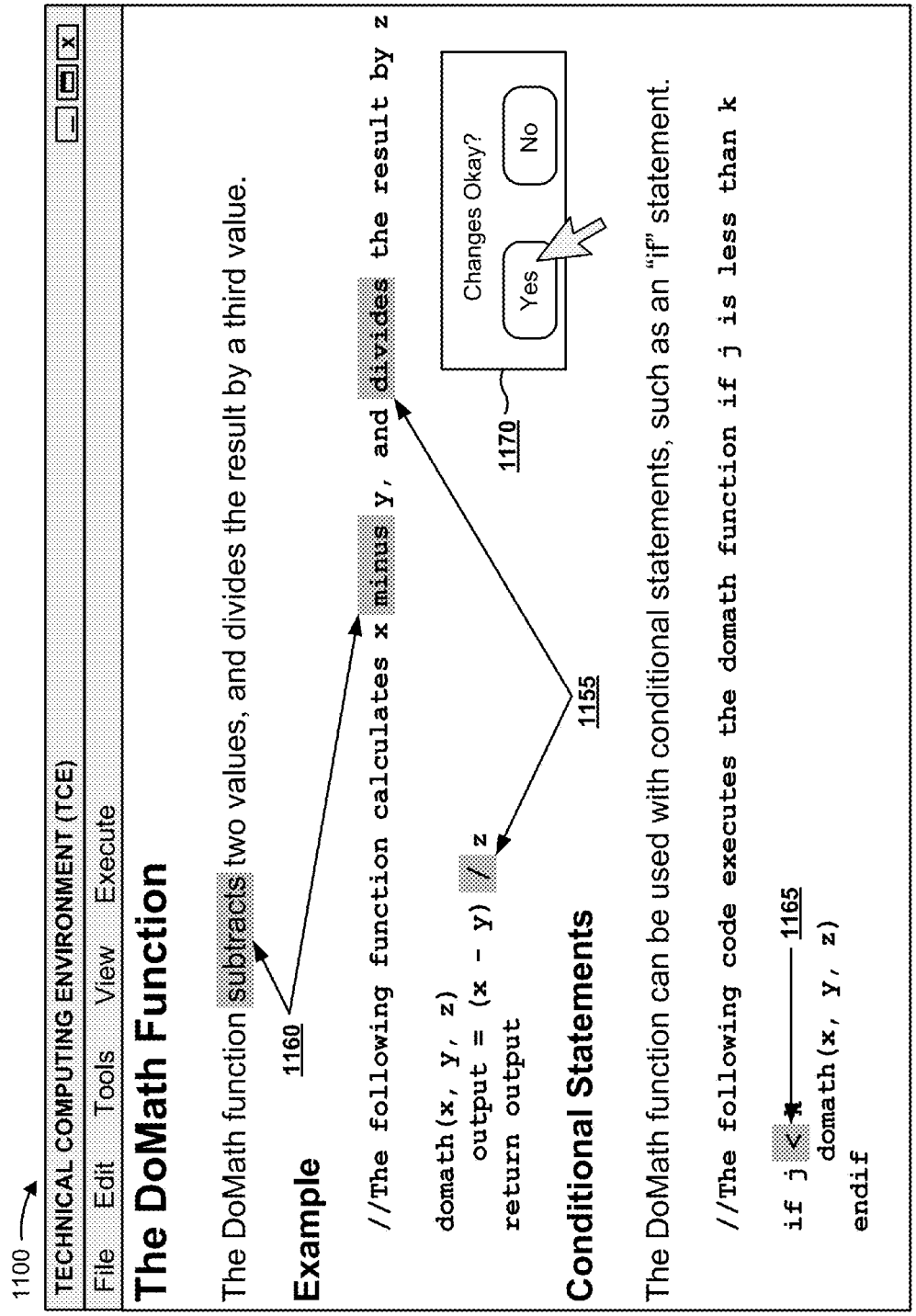

As shown in FIG. 11F, and by reference number 1155, assume that when the user changes the text "multiplies" to "divides," client device 210 replaces a multiplication sign (×) in the code with a division sign (/). Further, assume that since this code portion (the division sign) is linked to the "multiplies" text in the comment, client device 210 changes this "multiplies" text to "divides," as further shown by reference number 1155. In some implementations, the non-code portions (both occurrences of "multiplies") may be linked, and client device 210 may change "multiplies" to "divides" in the comment without first changing the multiplication sign (×) to the division sign (/).

As shown by reference number 1160, assume that when the user replaces the plus sign (+) in the top code section with the minus sign (−), client device 210 changes the text "adds" to "subtracts" and also changes the text "plus" to "minus." Finally, as shown by reference number 1165, assume that when the user changes "greater than" to "less than," client device 210 changes the greater than sign (>) to a less than sign (<). As shown by reference number 1170, client device 210 may prompt the user to accept the changes. Assume that the user accepts the changes.

As shown in FIG. 11G, and by reference number 1175, client device 210 may provide information that indicates links between code portions and non-code portions of the document. Furthermore, as shown by reference number 1180, client device 210 may provide an indication of a potential mismatch between corresponding portions (e.g., based on the text not matching, based on the portions not being associated in a data structure, etc.). For example, assume that client device 210 linked a greater than sign (>) in the code portion to the text "greater than" in the non-code portion. At a later time, assume that the user changed the greater than sign (>) to an equals sign (=), but declined to change the corresponding "greater than" text to "equals" (e.g., did not approve a change to the text when prompted by client device 210). In this case, client device 210 indicates a potential mismatch because the equal sign (=) is not identified as corresponding to the text "greater than" (e.g., in a data structure that indicates correspondences between code and non-code). In this way, a user may easily see linkages between code portions and non-code portions of a document, and may quickly identify potential problems with the linkages that may lead to confusion.

As indicated above, FIGS. 11A-11G are provided merely as an example. Other examples are possible and may differ from what was described with regard to FIGS. 11A-11G.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive information that identifies code included in a document provided via a programming environment, the code including executable program code capable of being executed via the programming environment;
receive information that identifies non-code included in the document,
the non-code including information other than executable program code;
identify a section, within the document, that includes a code portion or a non-code portion for which a link is to be created,
the code portion being included in the code,
the non-code portion being included in the non-code;
determine, based on the section, to create the link between the code portion and the non-code portion,
the one or more processors, when determining to create the link between the code portion and the non-code portion, are to perform one of:
search the document to determine that the code portion corresponds to the non-code portion, and determine to create the link between the code portion and the non-code portion based on determining that the code portion corresponds to the non-code portion,
search the code to identify the code portion, determine that the code portion matches the non-code portion, and determine to create the link between the code portion and the non-code portion based on determining that the code portion matches the non-code portion,
interact with a data structure that identifies corresponding code portions and non-code portions, determine that the code portion corresponds to the non-code portion based on the data structure, and determine to create the link between the code portion and the non-code portion based on determining that the code portion corresponds to the non-code portion, or
determine a proximity between the code portion and the non-code portion, and determine to create the link between the code portion and the non-code portion based on the proximity between the code portion and the non-code portion;
create the link between the code portion and the non-code portion based on determining to create the link between the code portion and the non-code portion;
provide, via a user interface, content included in the document,
the content including the code portion, the non-code portion, and other information included in the document; and
provide, via the user interface, a link indicator that identifies the link between the code portion and the non-code portion.

2. The device of claim 1, where the one or more processors, when providing the link indicator, are to:
provide, via the user interface, the code portion and the non-code portion in a first manner that is different from a second manner in which the other information is provided via the user interface.

3. The device of claim 1, where the one or more processors are further to:
detect a change to a first linked portion,
the first linked portion including one of:
the code portion, or
the non-code portion; and
modify a second linked portion based on detecting the change to the first linked portion,
the second linked portion including the other of:
the code portion, or
the non-code portion.

4. The device of claim 3, where the one or more processors, when modifying the second linked portion, are to:

modify text included in the second linked portion to match text included in the first linked portion.

5. The device of claim 3, where the one or more processors, when modifying the second linked portion, are to:
   interact with another data structure that identifies first text that corresponds to second text;
   determine that the first linked portion has been changed to include the first text; and
   modify the second linked portion to include the second text.

6. The device of claim 1, where the one or more processors are further to:
   detect a first user interaction, with the code portion, via the user interface;
   detect a second user interaction, with the non-code portion, via the user interface; and
   where the one or more processors, when creating the link between the code portion and the non-code portion, are to:
      create the link between the code portion and the non-code portion based on detecting the first user interaction and the second user interaction.

7. The device of claim 1, where the one or more processors are further to:
   identify the code portion and the non-code portion based on determining that first text, included in the code portion, matches second text included in the non-code portion; and
   where the one or more processors, when creating the link between the code portion and the non-code portion, are to:
      create the link between the code portion and the non-code portion based on identifying the code portion and the non-code portion.

8. A non-transitory computer-readable medium storing instructions, the instructions comprising:
   one or more instructions that, when executed by one or more processors, cause the one or more processors to:
      identify a code portion included in a document, the code portion including executable program code;
      identify a non-code portion, included in the document, that corresponds to the code portion included in the document, the non-code portion including non-executable information;
      analyze first text, associated with the code portion, and second text, associated with the non-code portion;
      determine a section, within the document, that includes the code portion or the non-code portion;
      determine to create a link between the code portion and the non-code portion based on analyzing the first text and the second text and further based on the section,
      the one or more instructions, that cause the one or more processors to determine to create the link between the code portion and the non-code portion, cause the one or more processors to perform one of:
         search the document to determine that the code portion corresponds to the non-code portion, and determine to create the link between the code portion and the non-code portion based on determining that the code portion corresponds to the non-code portion,
         search the document to identify the code portion, determine that the code portion matches the non-code portion, and determine to create the link between the code portion and the non-code portion based on determining that the code portion matches the non-code portion,
         interact with a data structure that identifies corresponding code portions and non-code portions, determine that the code portion corresponds to the non-code portion based on the data structure, and determine to create the link between the code portion and the non-code portion based on determining that the code portion corresponds to the non-code portion, or
         determine a proximity between the code portion and the non-code portion, and determine to create the link between the code portion and the non-code portion based on the proximity between the code portion and the non-code portion;
      store information that identifies the link between the code portion and the non-code portion based on determining to create the link between the code portion and the non-code portion;
      provide, via a user interface, content included in the document, the content including the code portion, the non-code portion, and other information included in the document; and
      provide, via the user interface, a link indicator that identifies the link between the code portion and the non-code portion.

9. The non-transitory computer-readable medium of claim 8, where the one or more instructions further cause the one or more processors to:
   detect a change to the code portion;
   determine that the code portion is linked to the non-code portion; and
   modify the non-code portion based on detecting the change to the code portion and further based on determining that the code portion is linked to the non-code portion.

10. The non-transitory computer-readable medium of claim 8, where the one or more instructions further cause the one or more processors to:
    detect a change to the non-code portion;
    determine that the non-code portion is linked to the code portion; and
    modify the code portion based on detecting the change to the non-code portion and further based on determining that the non-code portion is linked to the code portion.

11. The non-transitory computer-readable medium of claim 8, where the non-code portion includes at least one of:
    rich text, or
    a programming comment.

12. The non-transitory computer-readable medium of claim 8, where the code portion is a first code portion, where the non-code portion is a first non-code portion, where the link is a first link, and where the link indicator is a first link indicator; and
    where the one or more instructions, when executed by the one or more processors, further cause the one or more processors to:
       store information that identifies a second link between a second code portion, included in the document, and a second non-code portion included in the document; and
       provide, via the user interface, a second link indicator that identifies the second link between the second code portion and the second non-code portion.

13. The non-transitory computer-readable medium of claim 12, where the one or more instructions further cause the one or more processors to:
    receive an indication to show the second link indicator and hide the first link indicator; and where the one or more instructions, that cause the one or more processors to provide the second link indicator, cause the one or more processors to:
provide, for display, the second link indicator based on receiving the indication to show the second link indicator and hide the first link indicator,
the first link indicator not being displayed based on receiving the indication to show the second link indicator and hide the first link indicator.

14. The non-transitory computer-readable medium of claim 8, where the one or more instructions further cause the one or more processors to:
determine that the link indicator is associated with a particular type of link; and
receive an indication to hide link indicators associated with the particular type of link,
the link indicator not being displayed based on receiving the indication to hide link indicators associated with the particular type of link.

15. A method, comprising:
identifying a code portion, included in a document, that includes executable program code,
the identifying the code portion being performed by one or more devices;
identifying a non-code portion, included in the document, that corresponds to the code portion and that includes non-executable information,
the identifying the non-code portion being performed by the one or more devices;
identifying a section, within the document, that includes the code portion or the non-code portion,
the identifying the section being performed by the one or more devices;
creating a link between the code portion and the non-code portion based on identifying the code portion and the non-code portion and further based on the section,
the creating the link being performed by the one or more devices,
the creating the link including one of:
searching the document to determine that the code portion corresponds to the non-code portion, and creating the link between the code portion and the non-code portion based on determining that the code portion corresponds to the non-code portion,
searching the document to identify the code portion, determining that the code portion matches the non-code portion, and creating the link between the code portion and the non-code portion based on determining that the code portion matches the non-code portion,
interacting with a data structure that identifies corresponding code portions and non-code portions, determining that the code portion corresponds to the non-code portion based on the data structure, and creating the link between the code portion and the non-code portion based on determining that the code portion corresponds to the non-code portion, or
determining a proximity between the code portion and the non-code portion, and creating the link between the code portion and the non-code portion based on the proximity between the code portion and the non-code portion;
detecting a change to a first linked portion,
the first linked portion including one of the code portion or the non-code portion,
the detecting the change being performed by the one or more devices; and
modifying a second linked portion based on detecting the change to the first linked portion,
the second linked portion including the other of the code portion or the non-code portion,
the modifying being performed by the one or more devices.

16. The method of claim 15, where modifying the second linked portion comprises:
performing a first action or a second action,
the first action including:
obtaining first text included in the first linked portion based on the change to the first linked portion, and
modifying second text, included in the second linked portion, to match the first text; and
the second action including:
determining that the first linked portion has been changed to include third text,
the third text corresponding, in the data structure, to fourth text; and
modifying the second linked portion to include the fourth text based on determining that the first linked portion has been changed to include the third text.

17. The method of claim 15, where identifying the code portion and the non-code portion comprises:
determining that first text, included in the code portion, matches second text included in the non-code portion; and
where creating the link between the code portion and the non-code portion comprises:
creating the link between the code portion and the non-code portion based on determining that the first text matches the second text.

18. The method of claim 15, where identifying the code portion and the non-code portion comprises:
determining, based on information stored in the data structure, that first text, included in the code portion, corresponds to second text included in the non-code portion; and
where creating the link between the code portion and the non-code portion comprises:
creating the link between the code portion and the non-code portion based on determining that the first text corresponds to the second text.

19. The method of claim 15, where identifying the section that includes the code portion or the non-code portion comprises:
identifying a first section, within the document, that includes the code portion;
identifying a second section, within the document, that includes the non-code portion; and
where creating the link between the code portion and the non-code portion comprises:
determining that the first section and the second section are within a threshold proximity of one another within the document; and
creating the link between the code portion and the non-code portion based on determining that the first section and the second section are within the threshold proximity.

20. The method of claim 15, further comprising:
providing, via a user interface, content included in the document, the content including the code portion, the non-code portion, and other information included in the document; and providing, via the user interface and in association with the content included in the document, a link indicator that identifies the link between the code portion and the non-code portion.

* * * * *